US012578570B2

(12) United States Patent
Balili et al.

(10) Patent No.: US 12,578,570 B2
(45) Date of Patent: Mar. 17, 2026

(54) ELECTROWETTING, ACTIVE SELF-CLEANING SURFACE

(71) Applicant: Gentex Corporation, Zeeland, MI (US)

(72) Inventors: Ryan Barrido Balili, Holland, MI (US); Kurtis L. Geerlings, Zeeland, MI (US); Xiaoxu Niu, Grand Rapids, MI (US); Erik Christian Vyhmeister-Cancel, Berrien Springs, MI (US); David Martin Bostrom, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 362 days.

(21) Appl. No.: 18/324,700

(22) Filed: May 26, 2023

(65) Prior Publication Data

US 2023/0384580 A1 Nov. 30, 2023

Related U.S. Application Data

(60) Provisional application No. 63/346,016, filed on May 26, 2022.

(51) Int. Cl.
G02B 26/00 (2006.01)
B01L 3/00 (2006.01)
G02B 27/00 (2006.01)

(52) U.S. Cl.
CPC ...... *G02B 26/005* (2013.01); *B01L 3/502792* (2013.01); *G02B 27/0006* (2013.01); *B01L 2400/0427* (2013.01)

(58) Field of Classification Search
None
See application file for complete search history.

(56) References Cited

U.S. PATENT DOCUMENTS 4,896,174 A * 1/1990 Stearns ................ G03G 15/323
347/120
6,998,691 B2 2/2006 Baugh et al.
(Continued)

FOREIGN PATENT DOCUMENTS

EP 3733461 A1 * 11/2020 ................ B60S 1/56
WO 20210041709 A1 3/2021

OTHER PUBLICATIONS

Wikramanayake, Enakshi D., et al., "AC electrowetting promoted droplet shedding on hydrophobic surfaces," Appl. Phys. Lett. 116, 193701, 2020.
(Continued)

Primary Examiner — J. Christopher Ball
(74) Attorney, Agent, or Firm — Price Heneveld LLP; Brian James Brewer

(57) ABSTRACT

An optical element is provided that has an outer surface, the optical element including: a coating on the outer surface for causing any fluid thereon to form into fluid droplets; a plurality of independently activated electrodes each having a plurality of interdigitated fingers positioned proximate the outer surface and extending across an area of the outer surface; and a drive circuit for selectively applying signals to the plurality of electrodes. The AC signals applied to electrodes having adjacent fingers each have a phase shift such that fluid droplets are continuously swept in a predetermined direction across the outer surface. The electrode fingers may be arranged with a uniform pitch, where the pitch is the distance between the centers of the electrodes, the pitch being less than or equal to 750 μm??. The electrode fingers may be arranged in a single plane with gaps therebetween.

22 Claims, 23 Drawing Sheets

(56)        References Cited

U.S. PATENT DOCUMENTS

|  |  |  |  |
|---|---|---|---|
| 8,172,159 B2 | 5/2012 | Hernandez | |
| 8,899,761 B2 | 12/2014 | Tonar et al. | |
| 2014/0259468 A1* | 9/2014 | Maxik | B08B 6/00 |
| | | | 15/1.51 |
| 2018/0113297 A1 | 4/2018 | Desai et al. | |
| 2018/0264526 A1 | 9/2018 | Kim et al. | |
| 2019/0277787 A1* | 9/2019 | Chung | B08B 7/02 |

OTHER PUBLICATIONS

Burkhart, Collin Taylor, "Coplanar Electrowetting-Induced Droplet Ejection for 3D Digital Microfluidic Devices," Rochester Institute of Technology, Aug. 6, 2021.

Brinkmann, Martin et al., "Control of Liquids by Surface Energies," ResearchGate, Aug. 5, 2014.

Gao, Lichao et al., "Contact Angle Hysteresis Explained," Langmuir 2006, 22, 6234-6237, Apr. 27, 2006.

Abdelgawad, Mohamed, et al., "All-terrain droplet actuation," Lab Chip, 8, 672-677, 2008.

Verheijen, H. J. J., et al., "Reversible Electrowetting and Trapping of Charge: Model and Experiments," Langmuir, 15, 6616-6620, 1999.

Jain, Vandana, et al., "Design, fabrication and characterization of low cost printed circuit board based EWOD device for digital microfluidics applications," Microsystem Technologies, Feb. 2017.

Loo, Jodi, et al., "Co-planar light-actuated optoelectrowetting microfluidic device for droplet manipulation," Journal of Optical Microsystems, vol. 1(3), Jul.-Sep. 2021.

Edwards, A.M.J., et al., "Dielectrowetting: The past, present and future," Colloid & Interface Science 36, 28-36, 2018.

Li, Yifan, et al., "Test Structure for Characterizing Low Voltage Coplanar EWOD System," IEEE, pp. 80-85, 2008.

McHale, Glen, et al., "Dielectrowetting: Statics and Dynamics," Northumbria University, Dec. 27, 2013.

Drelich, Jaroslaw, et al., "The Effect of Drop (Bubble) Size on Advancing and Receding Contact Angles for Heterogeneous and Rough Solid Surfaces as Observed with Sessile-Drop and Captive-Bubble Techniques," Journal of Colloid and Interface Science, 179, 37-50, 1996.

Moqaddam, Ali Mazloomi, et al., "Dynamics of Contact Line Pinning and Depinning of Droplets Evaporating on Microribs," Langmuir, 34, 5635-5645, 2018.

Nelson, Wyatt, et al., "Droplet Actuation by Electrowetting-on-Dielectric (EWOD): A Rreview," Journal of Adhesion Science and Technology, 26, 1747-1771, 2012.

Zhao, Hongyu, et al., "Droplet motion on contrasting striated surfaces," Appl. Phys. Lett. 116, 2020.

Yonemoto, Yukihiro, et al., "Theoretical Model of Droplet Wettability on a Low-Surface-Energy Solid under the Influence of Gravity," The Scientific World Journal, 5 pages, 2014.

Jain, Vandana, et al., "Effect of electrode geometry on droplet velocity in open EWOD based device for digital microfluidics applications," Journal of Electrostatics, 87, 11-18, 2017.

Sasges, Michael R., et al., "Effect of gravity on contact angle: An experimental investigation," Journal of Chemical Physics, vol. 109, No. 9, Sep. 1, 1998.

Frieder, Mugele, et al., "Electrowetting: from basics to applications," J.Phys: Condens. Matter, 17, 2005.

Baird, E., et al., "Electrostatic force calculation for an EWOD-actuated droplet," Microfluid Nanofluid, 2007.

Zhao, Ya-Pu, et al., "Fundamentals and Applications of Electrowetting: A Critical Review," Rev. Adhesion Adhesives, vol. 1, No. 1, Feb. 2013.

Berthler, Jean, et al., "Mechanical behavior of micro-drops in EWOD systems: drop extraction, division, motion and constraining," NSTI-Nanotech, vol. 1, 2005.

Guo, J., et al., "Optimization and experimental verification of coplanar interdigital electroadhesives," J. Phys. D: Appl. Phys. 49, 2016.

Ward, C.A., et al., "Effect of gravity on contact angle: A theoretical investigation," J. Chem. Phys., vol. 109, No. 9, 1998.

Loo, Jodi Tsu-An, "Co-planar Optoelectrowetting (OEW) Device for Droplet Manipulation," University of California at Berkeley, Dec. 17, 2020.

Tan, Jie et al., "A transparent electrowetting-on-dielectric device drive by triboelectric nanogenerator for extremely fast anti-fogging," Nano Energy, pp. 1-9, Nov. 2021.

Lee, Kang Yong et al., "Smart self-cleaning cover glass for automotive miniature cameras," 2016 IEEE 29th International Conference on Micro Electro Mechanical Systems (MEMS), Jan. 28, 2018.

* cited by examiner

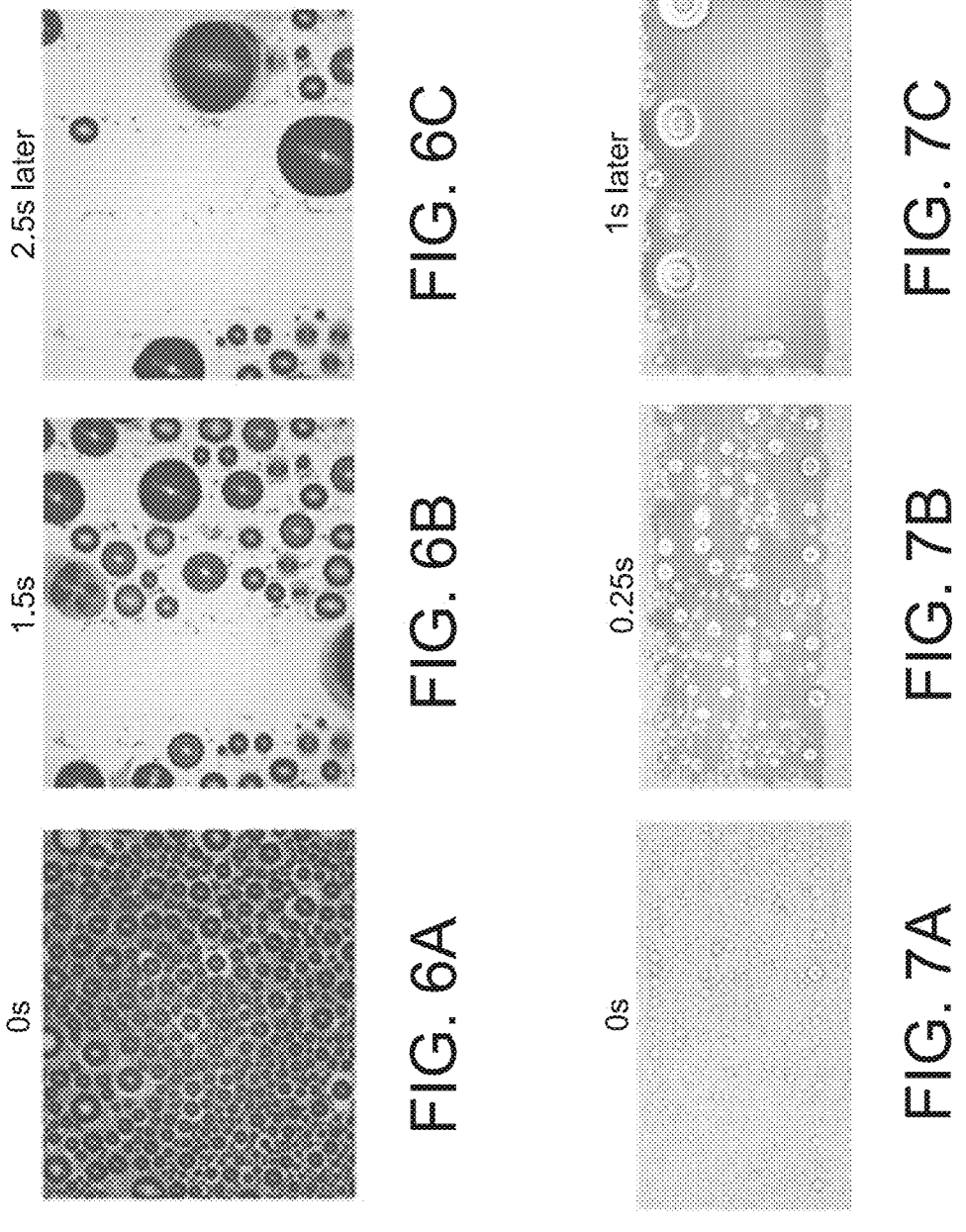

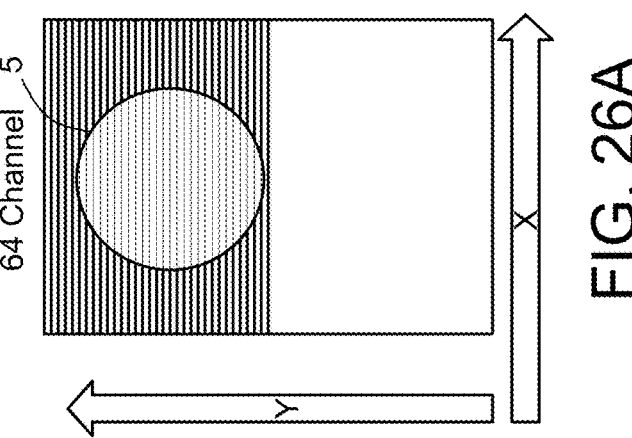
FIG. 25A
FIG. 26A
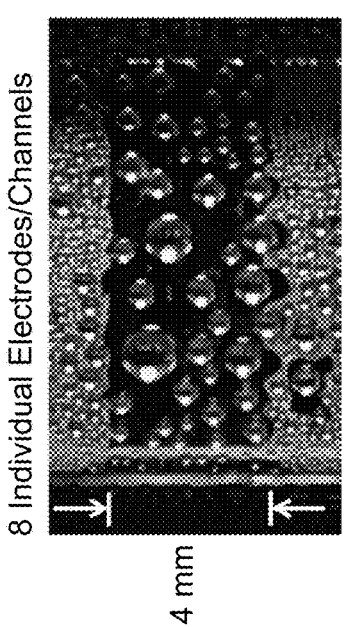
FIG. 25B
FIG. 26B

ELECTROWETTING, ACTIVE SELF-CLEANING SURFACE

CROSS-REFERENCE TO RELATED APPLICATION

This application claims priority to and the benefit under 35 U.S.C. § 119(e) of U.S. Provisional Patent Application No. 63/346,016, filed on May 26, 2022, entitled "ELECTROWETTING, ACTIVE SELF-CLEANING HYDRO-PHOBIC SURFACE," the entire disclosure of which is hereby incorporated herein by reference.

TECHNOLOGICAL FIELD

The present embodiments generally relate to a self-cleaning surface, and more particularly, to a self-cleaning surface for shedding fluids for use in a vehicle.

SUMMARY OF THE INVENTION

In one aspect of the invention, an optical element is provided that comprises: a substrate having an outer surface on which droplets of fluid may form; a number N of independently activated electrodes each identifiable by an order reference n (where n=1 to N), each electrode having a plurality of electrode fingers positioned proximate the outer surface and extending across an area of the outer surface, the electrode fingers being arranged in a repeating sequential order from 1 to N and; and a drive circuit for selectively applying phase-modulated AC signals to the electrodes, the drive circuit generates the phase-modulated AC signals by applying a number N of phase modulation signals to an AC signal with the number N of phase modulation signals equal to the number N of independently activated electrodes, each phase modulation signal also identifiable by the order reference n (where n=1 to N) to correspond to the respective electrodes, wherein each phase modulation signal periodically imposes phase shifts to the AC signal back and forth between an in-phase state and an anti-phase state with a period of $T_w$, wherein the phase shifts in each phase modulation signal n are delayed in time by time step $t_s$ from the phase shifts in the sequentially preceding phase modulation signal n−1 such that the droplets are continuously swept in a predetermined direction across the outer surface.

In another aspect of the invention, an optical element is provided that comprises: a substrate having an outer surface on which droplets of fluid may form; a plurality of independently activated electrodes each having a plurality of fingers positioned proximate the outer surface and extending across an area of the outer surface; and a drive circuit for selectively applying signals to the plurality of electrodes, wherein the electrode fingers are arranged with a uniform pitch, where the pitch is the distance between the centers of the electrodes, the pitch being less than or equal to 750 µm.

In another aspect of the invention, an optical element is provided that comprises: a substrate having an outer surface on which droplets of fluid may form; a plurality of independently activated electrodes each having a plurality of fingers positioned proximate the outer surface and extending across an area of the outer surface; and a drive circuit for selectively applying signals to the plurality of electrodes, wherein the electrode fingers are arranged in a single plane with gaps therebetween.

These and other features, advantages, and objects of the present device will be further understood and appreciated by those skilled in the art upon studying the following specification, claims, and appended drawings.

BRIEF DESCRIPTION OF THE DRAWINGS

The embodiments will now be described with reference to the following drawings, in which:

FIGS. 6A-6C are a series of photographs showing conglomeration of water droplets and gravity pulling down the larger droplets over a 2.5-second interval;

FIGS. 7A-7C are a series of photographs showing sweeping of water droplets over a one-second interval;

FIG. 25A is a top view of an active area of an eWash surface having 8 independent electrodes;

FIG. 25B is a photograph of water droplets on the active area of the eWash surface shown in FIG. 25A;

FIG. 26A is a top view of an active area of an eWash surface having 64 independent electrodes;

FIG. 26B is a photograph of water droplets on the active area of the eWash surface shown in FIG. 26A;

DETAILED DESCRIPTION OF EMBODIMENTS

Figure 2:
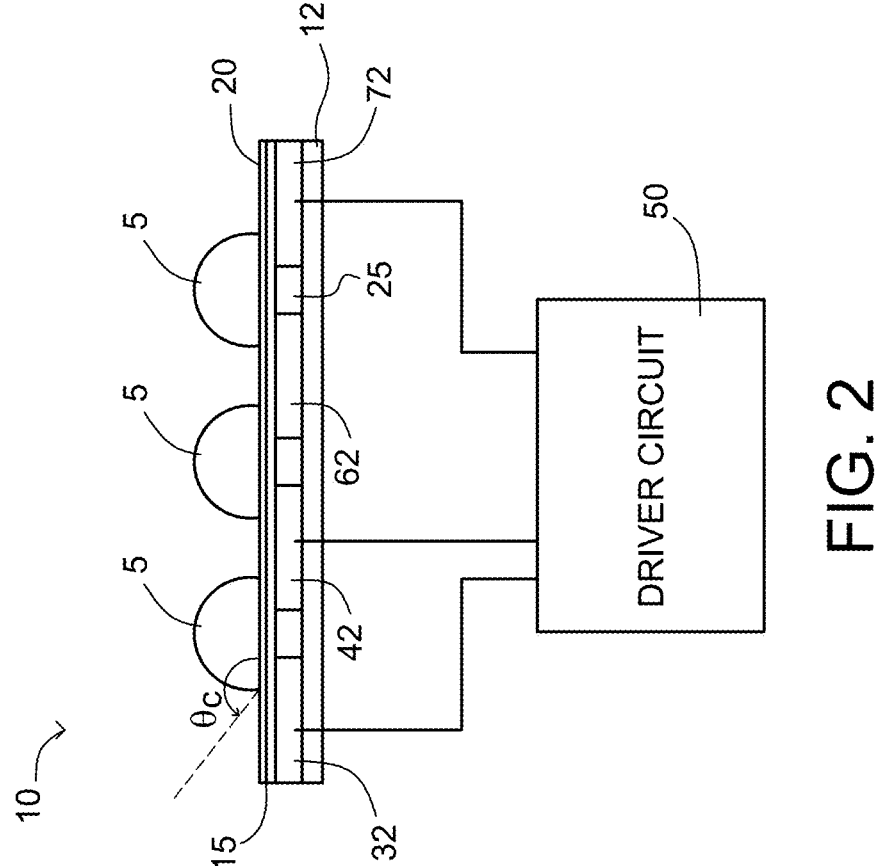
FIG. 2 is a graphic illustration of a cross-sectional view of the optical device shown in FIG. 1 with water droplets thereon.

For purposes of description herein, the terms "upper," "lower," "right," "left," "rear," "front," "vertical," "horizontal," and derivatives thereof shall relate to the invention as oriented in FIG. 2. Unless stated otherwise, the term "front" shall refer to the surface of the element that may be exposed to water, and the term "rear" shall refer to the surface of the element further from the front surface. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

As optical and electromagnetic imagers and sensors become ubiquitous, such as in advanced driver-assistance systems and autonomous driving vehicles, self-cleaning, outer surfaces become significant for a reliable operation of these sensors and imagers. Sensors and imagers operating in the field are subject to the elements of the environment that leave contaminants or water droplets on the first surfaces of the sensing devices. To keep the field of view unobstructed, contaminants on the first surface are preferably removed as quickly and efficiently as possible.

Mechanical wipers have been the conventional method of removing fluids and cleaning surfaces of windshields and first surfaces of various sensors and imagers. As future technology presses on toward advanced driver-assistance and unmanned systems, multiple sensors on several vital locations of a vehicle must be in place. A clear signal on these sensors requires unobstructed views through optical elements, such as the first surface of the optical or sensor device. Wipers, though effective, can obstruct the view of the sensors during operation and a plethora of these mechanical wipers will add to the weight, chances of mechanical failure, and power requirements of a vehicle. Adding wipers to self-cleaning surfaces, such as in bathrooms or building surfaces, is an eyesore.

Self-cleaning devices that apply intense mechanical vibrations to a surface have been proposed to clean vehicles. An example of such a device is disclosed in commonly-assigned U.S. Pat. No. 8,899,761. Though vibrations are capable of ejecting fluids and debris perpendicularly off a surface, in moving vehicles, unless blown to the side, the debris is likely to be propelled by air currents back to the surface. The droplets are swept along the surface as a conventional wiper would. If designed and oriented to sweep in the same direction, external forces such as gravity and air currents will assist and improve the efficiency of surface cleaning.

Another approach is to use a surface de-wetting apparatus using electrical signals on a surface with patterned electrodes, which, henceforth, will be referred to as the electro-Wetting, Active Self-cleaning Hydrophobic (eWASH) Surface. An example of an eWash surface is disclosed in U.S. Pat. No. 8,172,159 B2, which uses DC voltage applied to the patterned electrodes.

This disclosure relates to improved eWASH surfaces. The improved eWASH surfaces in this disclosure are non-obstructing, robust, non-mechanical solutions to cleaning surfaces. These improved eWASH surfaces can be made of transparent materials that are unnoticeable to the naked eye.

The improved eWash surfaces enable the movement of multiple droplets of fluids, of various droplet sizes in the order of tens of microns to millimeters, scalable to large areas, for whatever application. The improved eWash surfaces do not necessarily just clear or clean a surface, but more generally, they move droplets, which could be useful for other purposes such as active water collection in coastal deserts where there is always a fog at some portion of the day but no rain. For a water collection application, water can be actively swept into a collection basin before it evaporates or even before condensation/accumulation reaches volume threshold for gravity to overcome static friction and affect the motion of the droplets. Note that the required droplet size for gravity to move the droplet may not be achievable depending on weather conditions. With this technology, however, water droplets can be moved without the need to wait for the droplet size to get large enough for gravity to take over.

A novel feature of this eWASH surface cleaning device not found in self-cleaning surfaces is the induced motion of droplets by electrowetting, gravity, or other mechanism, to effectively sweep fluid from the surface. The eWASH system can conglomerate small droplets of water, common solvents, and cleaning fluids into larger droplets and let external forces, such as gravity, shed the droplets. At the same time and/or at various points in time and regions of the surface, the self-cleaning device may sweep fluid droplets actively and continuously along a direction or multiple directions appropriate for the application.

Figure 1:
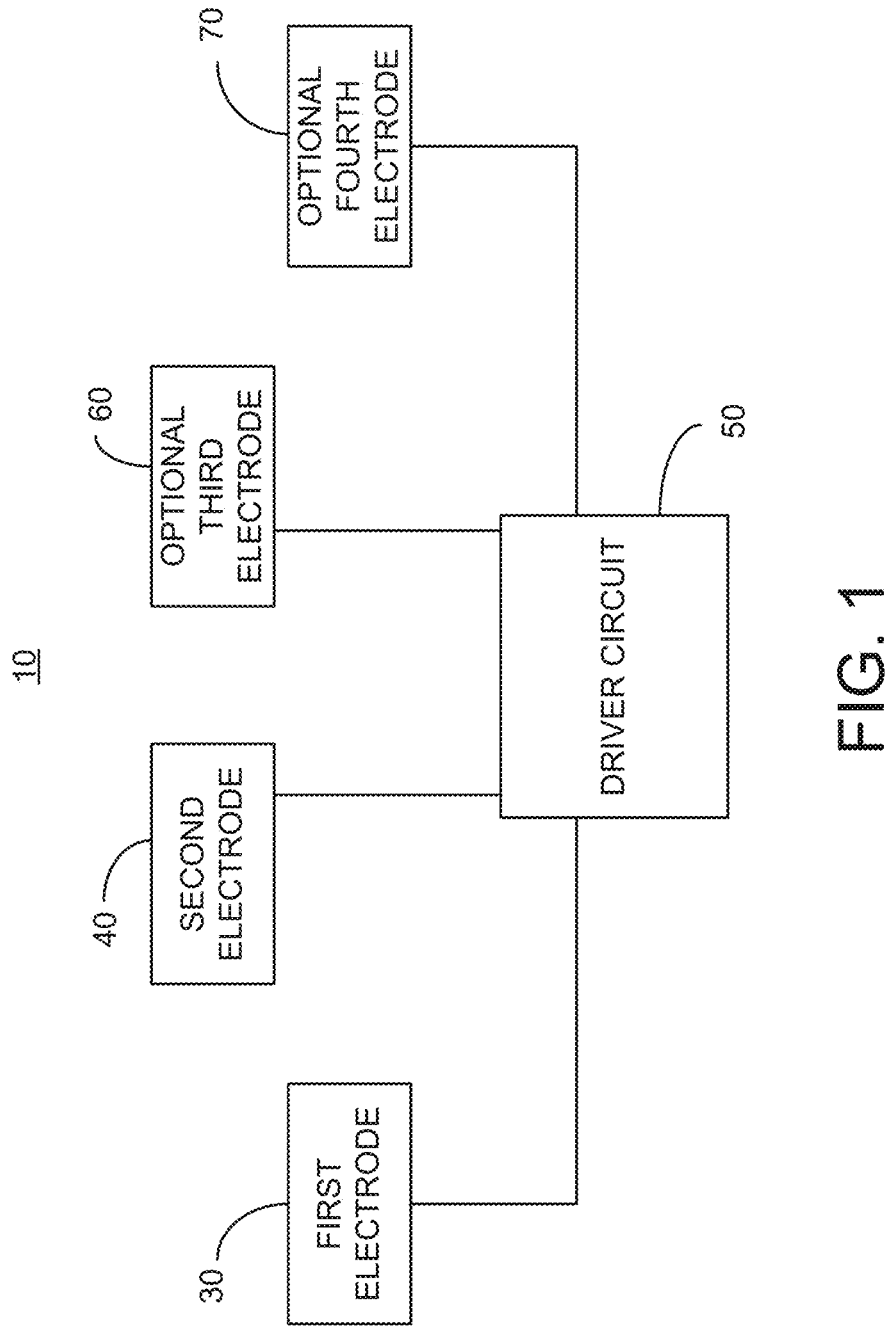
FIG. 1 is an electrical diagram in block form of an optical device of an embodiment described herein.

As shown in FIGS. 1 and 2, the embodiment described below relates to an optical element 10 having an outer surface 15, the optical element 10 includes: an optional hydrophobic (or omniphobic) coating 20 on the outer surface 15 for causing any fluid thereon to form into fluid droplets 5; a dielectric layer 25 on which the hydrophobic coating 20 is disposed; a plurality of interdigitated electrodes 30, 40, 60, 70 positioned on the dielectric layer 25 proximate the outer surface 15 and extending across an area of the outer surface 15; and a drive circuit 50 for selectively applying AC signals to the plurality of electrodes 30, 40, 60, 70, wherein the AC signals applied to adjacent electrodes each have a phase shift relative to one another in such a manner as to continuously sweep fluid droplets 5 in a predetermined direction across the outer surface 15.

According to one embodiment, the plurality of electrodes may include a first electrode 30 positioned proximate the outer surface 15, the first electrode 30 having a plurality of first fingers 32 extending across an area of the outer surface 15, and a second electrode 40 positioned proximate the outer surface 15, the second electrode 40 having a plurality of second fingers 42 extending across the area of the outer surface 15 and being interdigitated with the plurality of first fingers 32 in spaced relation.

The plurality of electrodes may further include an optional third electrode 60 having a plurality of third fingers 62 extending across the area of the outer surface 15 and being interdigitated with the plurality of first fingers 32 and the plurality of second fingers 42 in spaced relation and an optional fourth electrode 70 having a plurality of fourth fingers 72 extending across the area of the outer surface 15 and being interdigitated with the plurality of first fingers 32, the plurality of second fingers 42, and the plurality of third fingers 62 in spaced relation. As explained below with respect to additional embodiments, a larger number of electrodes may be provided.

The drive circuit 50 may be further configured to selectively apply a voltage potential between the first electrode 30 and the second electrode 40 (and optionally between third electrode 60 and fourth electrode 70) in such a manner as to conglomerate the fluid droplets into larger fluid drops and/or sweep the fluid droplets across a surface.

The optical element 10 may be used in a number of applications. One example is a transparent cover for a camera or imager for a vehicle where the transparent cover includes the optical element 10. Other non-limiting examples include: a lens cover slip; a lens first surface; a windshield; vehicle windows; building windows; solar cells; mirrors; any self-cleaning surfaces (automotive, domestic); a cover lens for Lidar or Radar; and a camera cover.

FIG. 2 shows the basic structure of the eWASH system on a surface 15 or substrate 12 according to the first embodiment. An electrode array layer (32, 42, and optionally 62 and 72), the dielectric layer 25, and the hydrophobic, omniphobic, and/or oleophobic layer 20 can each be made of multiple layers of the same or different material. The hydrophobicity and/or oleophobicity of the topmost layer 20 in contact with a fluid is characterized by a fluid's contact angle ($\theta_C$) on the surface 15. The dielectric layer 25 and hydrophobic layer 20 may be made of a different material layer or be made of one and the same layer. The substrate 12 itself may be one and the same as the dielectric layer 25 or may be a separate layer from the dielectric layer 25. Further, the substrate 12 itself or the dielectric layer 25 itself may have hydrophobic properties thereby eliminating the need for a separate coating 20. The conductive electrodes 30, 40, 60, and 70 and/or fingers 32, 42, 62, and 72 thereof may be placed on the bottom surface of the dielectric layer 25. On the active area, the individual electrodes 30, 40, 60, and 70 are not necessarily electrically in contact with each other, but fingers 32, 42, 62, and 72 could be grouped together into sets via contacts outside the active area. The overall pattern of the electrodes 30, 40, 60, and 70 will vary according to the embodiment or application. One or more electrodes 30, 40, 60, and 70 may be directly exposed to the environment or be placed on the first surface 15. Gaps between electrodes 30, 40, 60, and 70 need not be uniform. Electrodes 30, 40, 60, and 70 may be opaque or transparent. Although the outer surface 15 is preferably hydrophobic, the embodiments described below will work with surfaces that may not be considered hydrophobic (i.e., where the contact angle is less than 90 degrees.

This eWASH surface will de-wet water effectively. Other fluids and solvents such as water-alcohol mixtures, salty-water, etc. may also be cleaned. The degree of efficacy on various fluids depends on the fluid's interaction with the hydrophobic coating 20 and the fluid's polarizability. The power or voltage level applied by the driver circuit to the electrodes 30, 40, 60, and 70 may be tuned to be more efficient with fluids or solvents other than water.

Fluids, either non-polar, polar, or electrolytic, can be polarized at varying degrees in the presence of an electric field. For example, applying an electric field on nonpolar molecules, e.g., isopropyl alcohol, displaces the electron cloud inducing a dipole moment. Water, on the other hand, is polar and is composed of molecules that have a net permanent dipole due to its molecular charge distribution. These water molecule dipoles align themselves along the electric field whenever present (see FIG. 3).

Dielectrophoretic phenomenon is often the principle alluded to when explaining the dynamics of the system due to forces on this polarized dielectric or water droplet 5. A brief description of the phenomenon is provided below. Because of the polarization of the permanent or induced dipoles of the fluid, these neutral fluid droplets become subject to electric forces. For example, energy minimization of the induced droplet dipole in the presence of a gradient in electric field, $$\vec{F} = -\vec{\nabla}(U) = \vec{\nabla}(\vec{p}(r) \cdot \vec{E}),$$

leads to driving forces. For the electrode geometry and droplet position shown in FIG. 3, the electric forces will flatten the droplets 5. The equation also tells us that polarized droplets are attracted towards regions of increasing electric fields. With an appropriate electrode geometry to create a dynamic field map, the droplet-flattening effect and attractive forces can be used to conglomerate and/or sweep droplets off a surface.

An equivalent way of looking at the electrowetting phenomenon is in terms of the dynamic changes to the induced contact angle of the fluid 5 on the surface. When an inhomogeneous field is present between a gap or in regions with differential voltage, water droplets become attracted to the electrode gap or wets on that region while exhibiting a decreased contact angle. Once the voltage differential is removed, the contact angle increases.

As noted above, droplets may be cleared by conglomeration or sweeping. In addition, a combination of conglomeration and sweeping may be used. These three modes of cleaning are discussed below.

Figures 3, 4A, 4B, 4C, 5A, 5B, 5C:
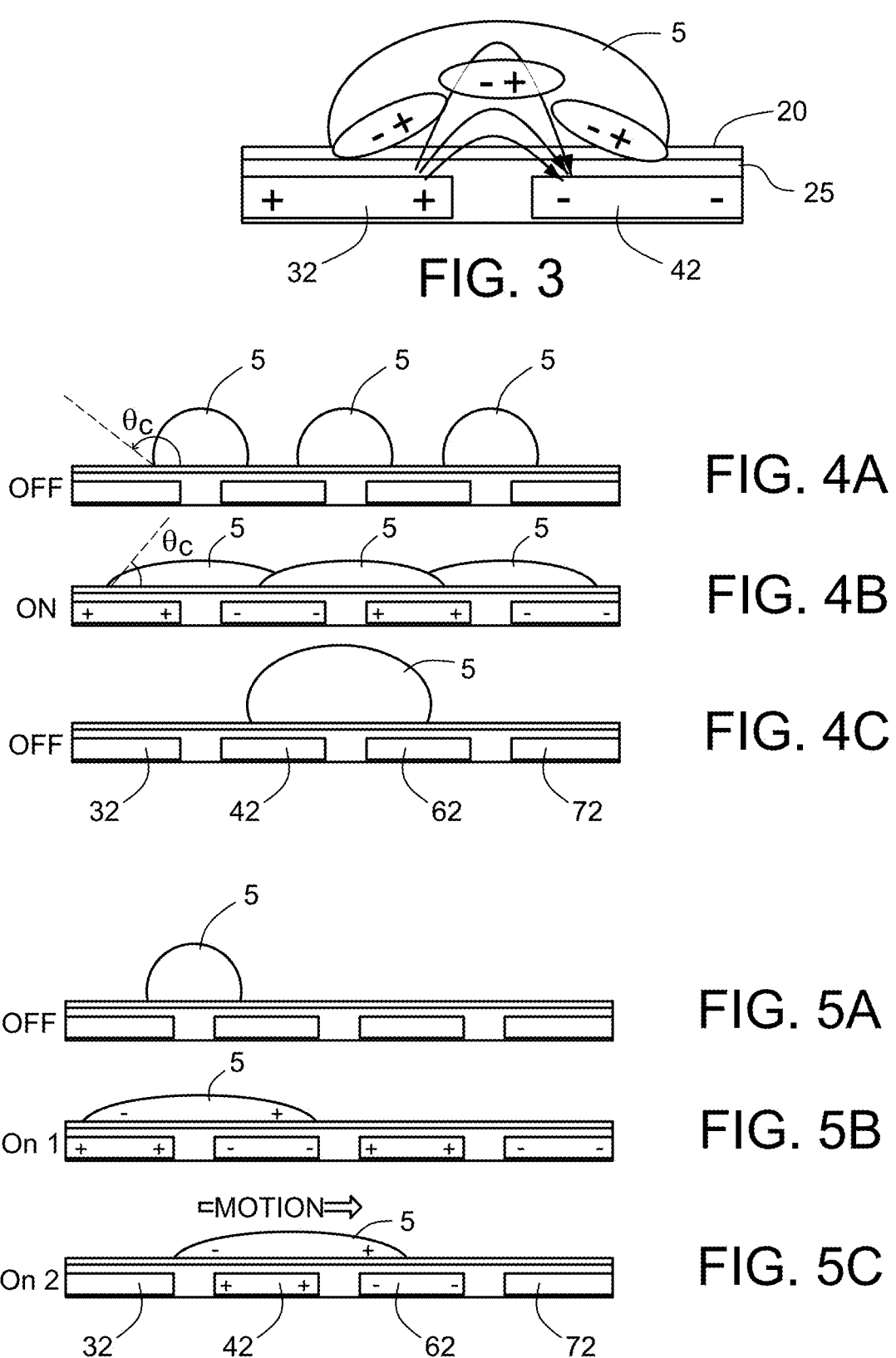
FIG. 3 is a graphic illustration of an enlarged cross-sectional view showing the alignment of polar molecules due to the presence of an electric field within a water droplet.
FIGS. 4A-4C are a series of graphic illustrations demonstrating conglomeration of water droplets over time.
FIGS. 5A-5C are a series of graphic illustrations demonstrating sweeping of water droplets over time.

First, the conglomeration mode is described with reference to FIGS. 4A-4C which show parallel or interdigitated electrodes (IDE) 30, 40, 60, and 70 that could have alternating voltage at once or have arbitrary voltages applied on individual fingers at various times and order. Electric fields are generated when a differential voltage is applied between electrode fingers 32, 42, 62, and 72. The field profile and intensity results to the flattening of the droplets 5. The flattened droplets 5 reach out to other flattened droplets and merge to form a larger droplet 5. Large droplets 5 slide off more efficiently via external forces such as gravity and air currents.

Passive conglomeration can also be achieved by cleverly patterning a surface with hydrophobic and hydrophilic regions. This is discussed further below.

Another novel idea is the process of actively removing fluid droplets 5 from an eWASH surface 15 by sequentially sweeping the presence of the fields across the surface 15. The sweeping mode is illustrated in FIG. 5. As discussed previously, the droplets 5 are attracted towards regions with pairs of electrode fingers 32, 42, 62, and 72 that have differential voltage where inhomogeneous electric fields are present. Therefore, when pairs or groups of electrode fingers 32, 42, 62, and 72 are powered sequentially as illustrated in FIGS. 5A-5C, droplets 5 of fluid that can span the next electrode are moved in the direction of the electrical sweep. The profile for electrical sweeping, sweeping direction, and geometry is described below.

Example results with a glass substrate, indium-tin-oxide (ITO) electrodes 30, 40, and 70, a SU8 photoresist as the dielectric 25, and Teflon® AF as the hydrophobic layer 20 are shown in FIGS. 6A-6C and 7A-7C. FIGS. 6A-6C show an example of conglomeration (vertical orientation) and shedding (gravity along finger). FIGS. 7A-7C show an example of sweeping (horizontal orientation), no assistance from gravity.

Efficient de-wetting and surface cleaning may involve both conglomerating droplets and sweeping them during the cleaning procedure. The electric powering profile, conglomeration or sweeping, may be done in arbitrary order, or may be happening at the same time at different regions of the sample.

Figure 8:
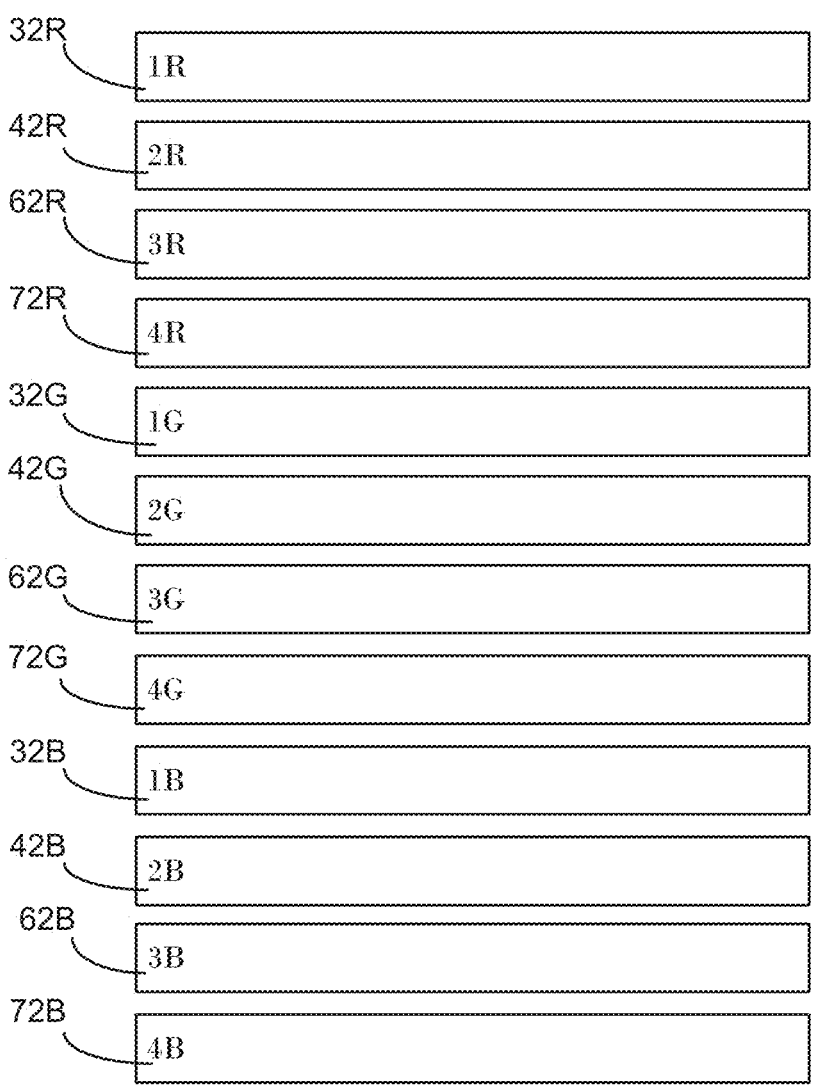
FIG. 8 is a graphic representation of an example of a row of electrode fingers.

There are various ways to sweep electrodes by sequentially powering groups of electrodes 30, 40, 60, and 70. A novel idea is being able to continuously and sequentially power electrodes 30, 40, 60, and 70 without having to power each electrode independently. FIG. 8 helps describe the execution of the idea. One starts with a manageable number of electrodes 30, 40, 60, and 70 that may be independently powered, e.g., four electrode fingers 32, 42, 62, and 72 one after another numbered 1-4. These sets of four electrode fingers can be repeated to add up to however many electrode fingers are desired. In this example, there will be three sets (or tiles) of fingers 32, 42, 62, and 72 tagged R, G, and B, respectively, for a total of 12 electrode fingers as shown in FIG. 8. The electrode fingers 32R, 32G, and 32B that are numbered 1 on all the three sets are physically connected (connection methods are described below) and so are the number 2 electrode fingers 42R, 42G, and 42B; number 3 electrode fingers 62R, 62G, and 62B; and number 4 electrode fingers 72R, 72G, and 72B. Therefore, when electrode number 1 (30) is powered, all the number 1 fingers 32R, 32G, and 32B on all other sets are also powered. In other words, fingers 32R, 32G, and 32B receive the same signal with the same phase from the driver circuit 50. These electrode fingers are thus considered to be interdigitated and arranged in tiles. In other words, the plurality of interdigitated fingers 32, 42, 62, and 72 are arranged in a plurality of tiles R, G, and B where each tile R, G, and B includes one finger 32, 42, 62, and 72 of each of the plurality of electrodes p30, 40, 60, and 70 provided in a sequential order, wherein the sequential order is repeated for each tile R, G, and B.

Figure 9:
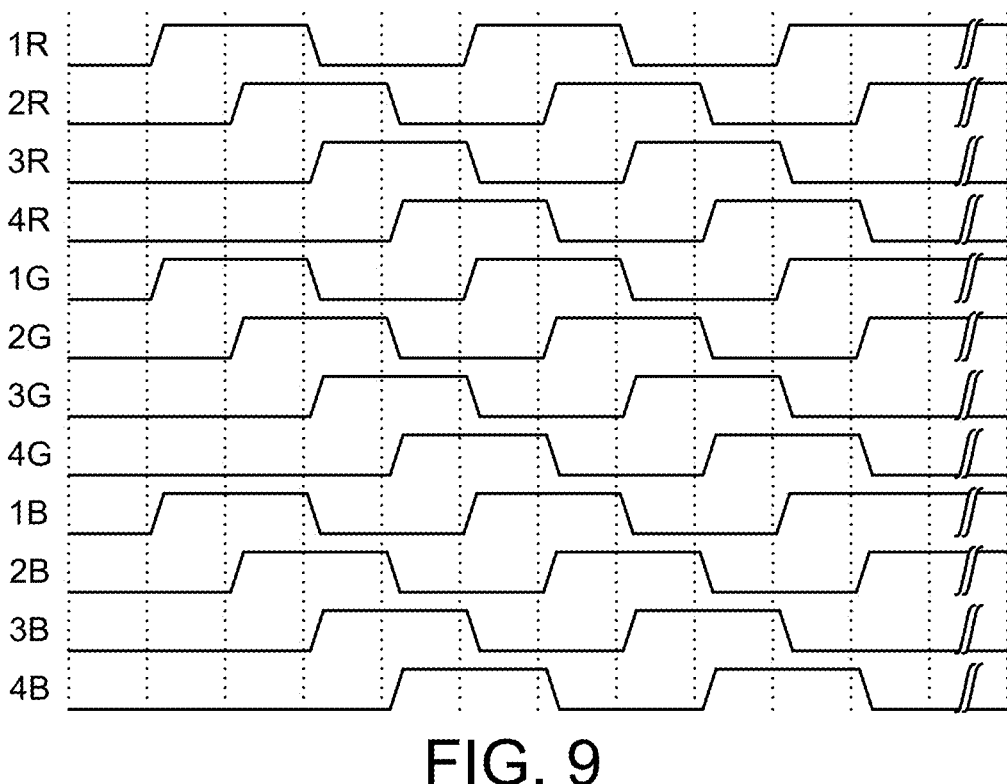
FIG. 9 is a first timing chart showing the phase modulation signals used to modulate an AC signal to generate phase-modulated signals delivered to each of the interdigitated electrode fingers shown in FIG. 8.
Figure 10:
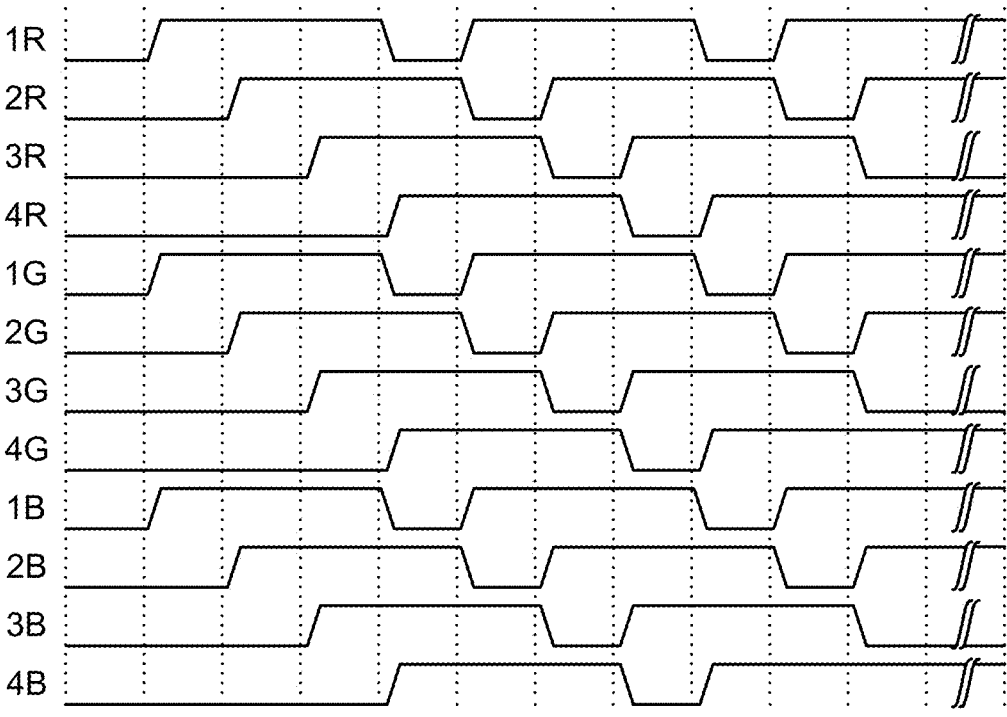
FIG. 10 is a second timing chart showing the phase modulation signals used to modulate an AC signal to generate phase-modulated signals delivered to each of the interdigitated electrode fingers shown in FIG. 8.

To create an effectively continuous sweep on all the electrodes, one may construct the driver circuit 50 to cause the signal period or powering-cycle on a finger 32, 42, 62, and 72 to be equal to the period of the sweep on a set. Once this protocol is applied sequentially on all sets, a fluid droplet positioned on the first set will be swept, as if continuously, as it moves along through all sets of electrodes 30, 40, 60, and 70. The continuous sweeping effect is illustrated in example timing diagrams shown in FIGS. 9 and 10.

Regarding sweep geometry or direction, the electrodes 30, 40, 60, and 70 could, for example, be oriented with their fingers 32, 42, 62, and 72 extending horizontally, perpendicular to the direction. of gravity so that the sweep direction could be parallel, or anti-parallel, to the direction of the pull of gravity. The ability to orient the electrode fingers 32, 42, 62, and 72 and direct the sweep with proper electrode power sequencing plus conglomeration opens an unlimited number of directions in which one could sweep the fluid droplets (novel electrode geometries are discussed below).

A non-exhaustive list of sweeping geometries and directions includes: up—down sweep; left—right sweep; sweep from center-out; sweep from center-in to induce conglomeration; sweep towards one or multiple conglomeration points; radial sweep (inward or out); and diagonal and arbitrary angle sweeps.

A droplet staging/initialization region may be created for a snowballing effect. The idea here is to give a head start for conglomeration and/or sweeping outside the active area so that by the time the droplets reach the active area, they have snowballed into sizes that more efficiently clean the active area or reach volumes that are more susceptible to de-wetting forces and external forces.

The difference in fields between electrodes/fingers may be achieved by applying AC voltage signals in various waveforms (square, sine etc.). Frequency, waveform, phase, and voltage may be optimized in concordance with the details of the geometry (finger widths, gap widths, layer thickness) and electrical properties of the material (substrate, dielectric, hydrophobic coating).

Figure 11:
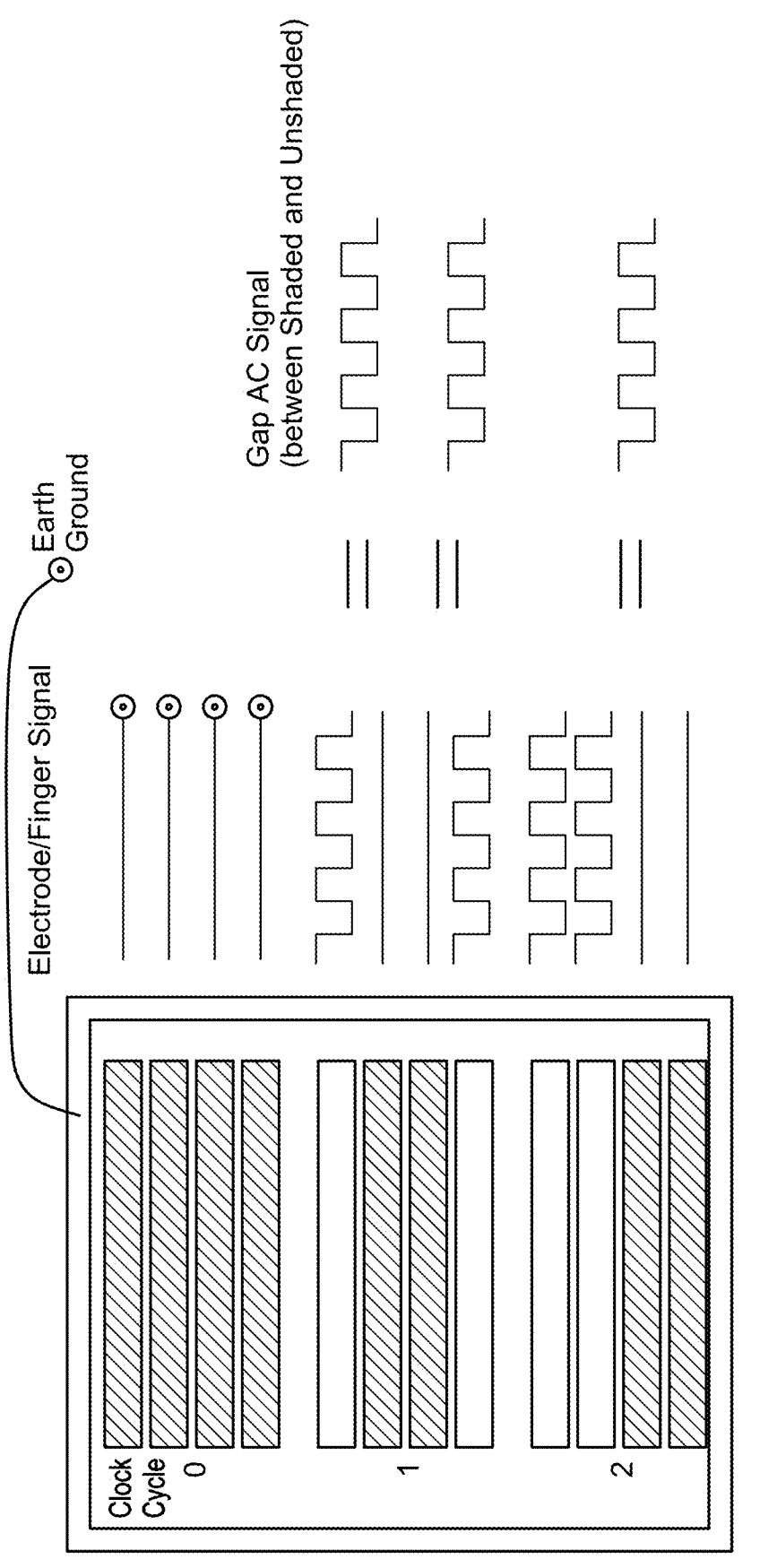
FIG. 11 is a third timing chart showing the electrical signals delivered to each of the interdigitated electrode fingers.

Each electrode 30, 40, 60, and 70 may be switched between a live state, a grounded state, a floating state or flip-flopped between the states continuously during operation. Grounding all electrodes 30, 40, 60, and 70 intermittently will leave time for droplets to not be electrically attracted to the surfaces and may help in efficiently letting external forces such as gravity and/or wind to sweep the water droplets and contaminants. An example of such an approach is shown in FIG. 11.

Figure 12:
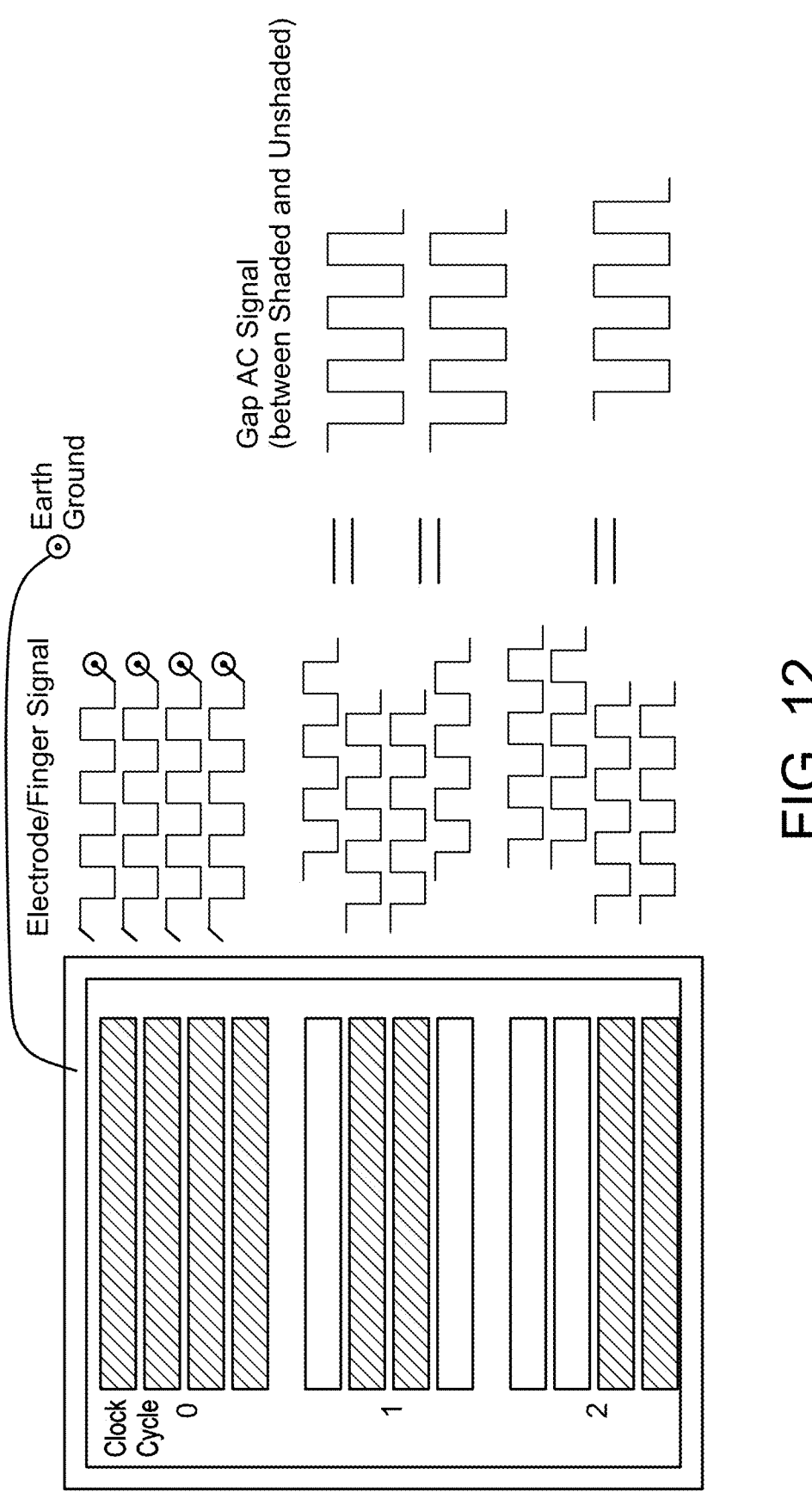
FIG. 12 is a fourth timing chart showing the electrical signals delivered to each of the interdigitated electrode fingers.

The signals applied to the electrodes may be phase-modulated. A uniform waveform may be applied on all the electrodes 30, 40, 60, and 70. Differential voltage is achieved by applying phase differences of the waveforms between electrodes 30, 40, 60, and 70. The out-of-phase regions may then be sequentially swept through the fingers to achieve sweeping of fluid droplets. An example is shown in FIG. 12.

Amplitude and phase modulation may be applied at various times or both amplitude and phase modulation may be applied at separate regions of the active area at the same time. The phase difference in a gap relative to another gap may be fixed or phases in a series of gaps may vary continuously or arbitrarily. The amplitude of the voltage differential can also be adjusted by tuning the phase difference between electrodes 30, 40, 60, and 70. The driver circuit 50 can source two-phase or multiple-phase output signals to individual electrodes. Multi-pole or multi-throw switches between available signals and individual fingers 32, 42, 62, and 72 could then toggle or wave-select between the different signals to create an appropriate voltage sweep profile.

Figure 13A:
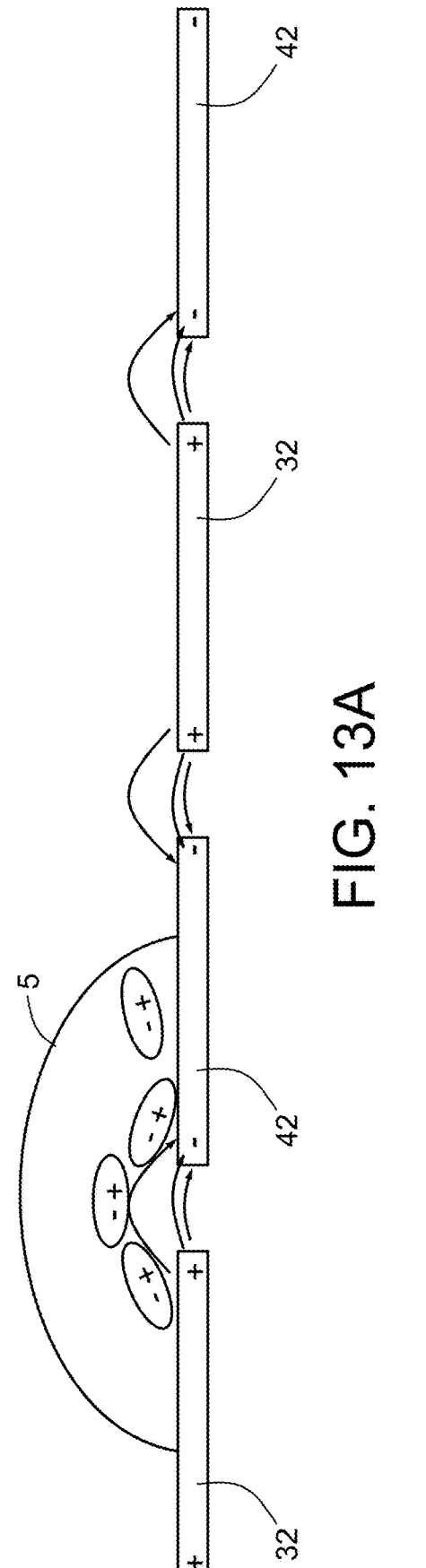
FIGS. 13A and 13B are a pair of graphic representations of the electric fields imposed on a water droplet with and without the use of floating or grounded electrodes.
Figure 13B:
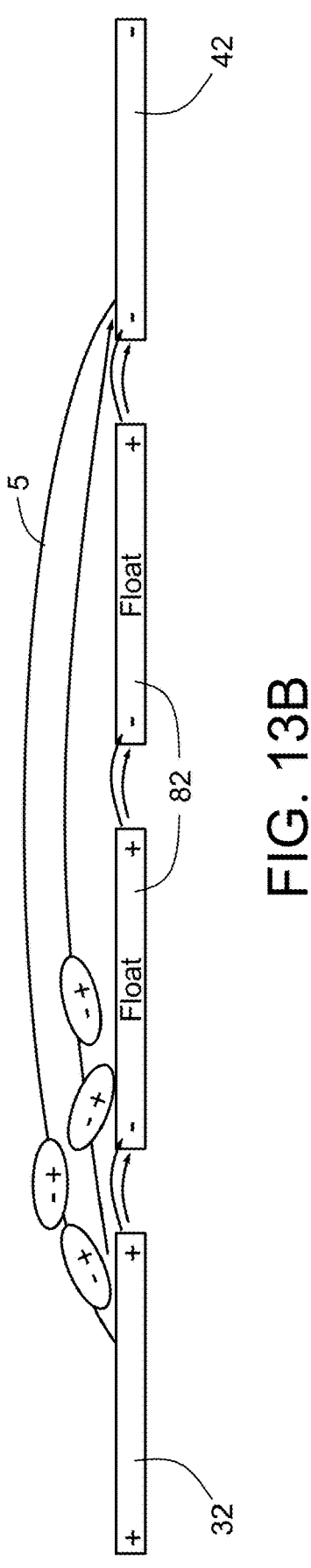

Various novel geometries may be employed for the electrodes 30, 40, 60, and 70. While parallel or inter-digitated electrodes (IDE) are the simplest pattern that can be realized for the electro-wetting and active self-cleaning feature, many other electrode-pattern variations are possible. One such example is floating fingers 82. Depending on the self-cleaning mode of operation, conglomeration and/or sweeping, the direction of the IDE may be oriented in parallel or perpendicular to the shedding/sweeping direction. For example, if the fingers 32, 42, 62, and 72 have alternating high and low voltages (see FIGS. 13A and 13B), the droplet 5 will have difficulty crossing the next gap because of the orientation of the electric field on the next gap. In this case, self-cleaning on the surface would be more efficient if the IDE were to be aligned along the direction of gravity or other external forces which avoids the predicament of water droplets having to cross gaps with opposing fields or opposing forces.

A useful trick for droplets to expand and traverse a gap is by placing an electrically insulated or floating, conducting electrode finger(s) 82 in between two electrode fingers 32 and 42 with a voltage differential. If the droplet 5 is large enough, the droplets 5 may stretch all the way between the two live electrode fingers 32 and 42 (see FIG. 13B). There will also be no opposing fields between the live electrode fingers 32 and 42. The fields around the gaps of the floating electrode fingers 82 will always be in the same direction. This has the added benefit of the droplets within the active electrode fingers 32 and 42 to be attracted to each other.

Figures 14A, 14B:
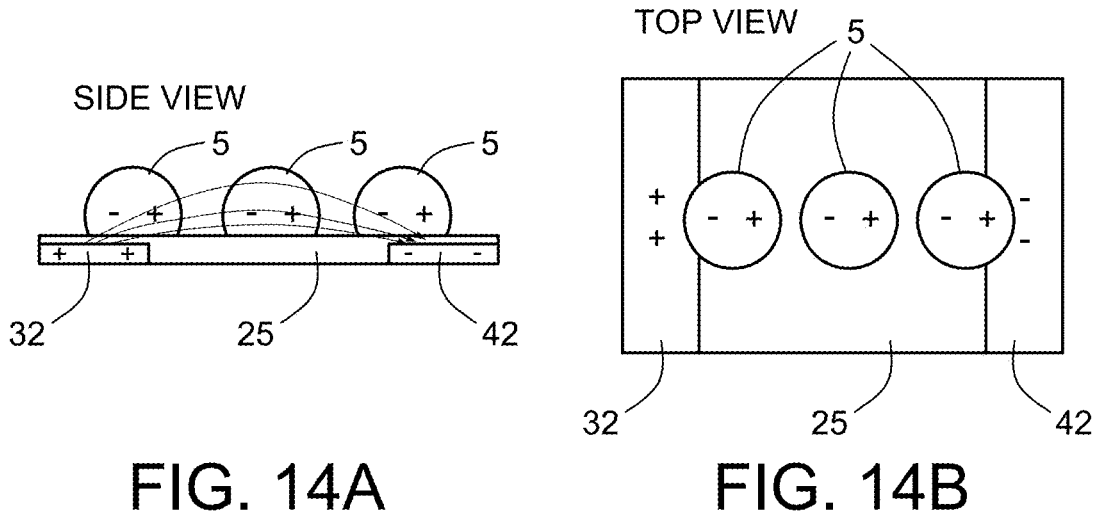
FIGS. 14A and 14B are a side view and a top view of a plurality of water droplets bridging a gap between electrodes.
Figure 15A:
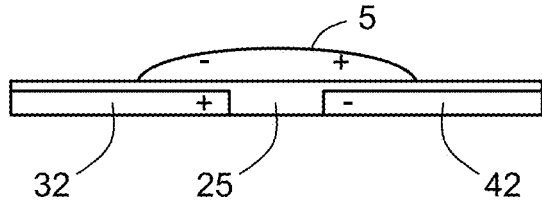
FIGS. 15A and 15B are a pair of graphic representations of the electric fields imposed on a water droplet with and without the use of floating/ground/common/neutral/HiZ electrodes.
Figure 15B:
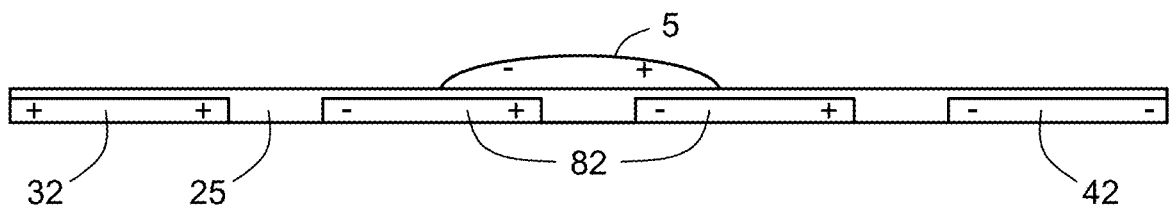

Floating electrode fingers 82 also avoid droplets 5 from getting statically attracted to the electrode fingers 32 and 42 as illustrated in FIGS. 14A and 14B. When the dielectric is very thin (dielectric thickness<<gap width), the probability of leaving residual charge on the electrode fingers 32 and 42 and static polarization of the water droplet 5 is high (see FIGS. 15A and 15B).

Floating fingers 82 are neutral and insulated. Hence, the net charge is unchanged or always balanced. Whatever charge separation that would occur when the device is powered will be lost on the floating finger once the device powering is terminated.

Figures 16A, 16B:
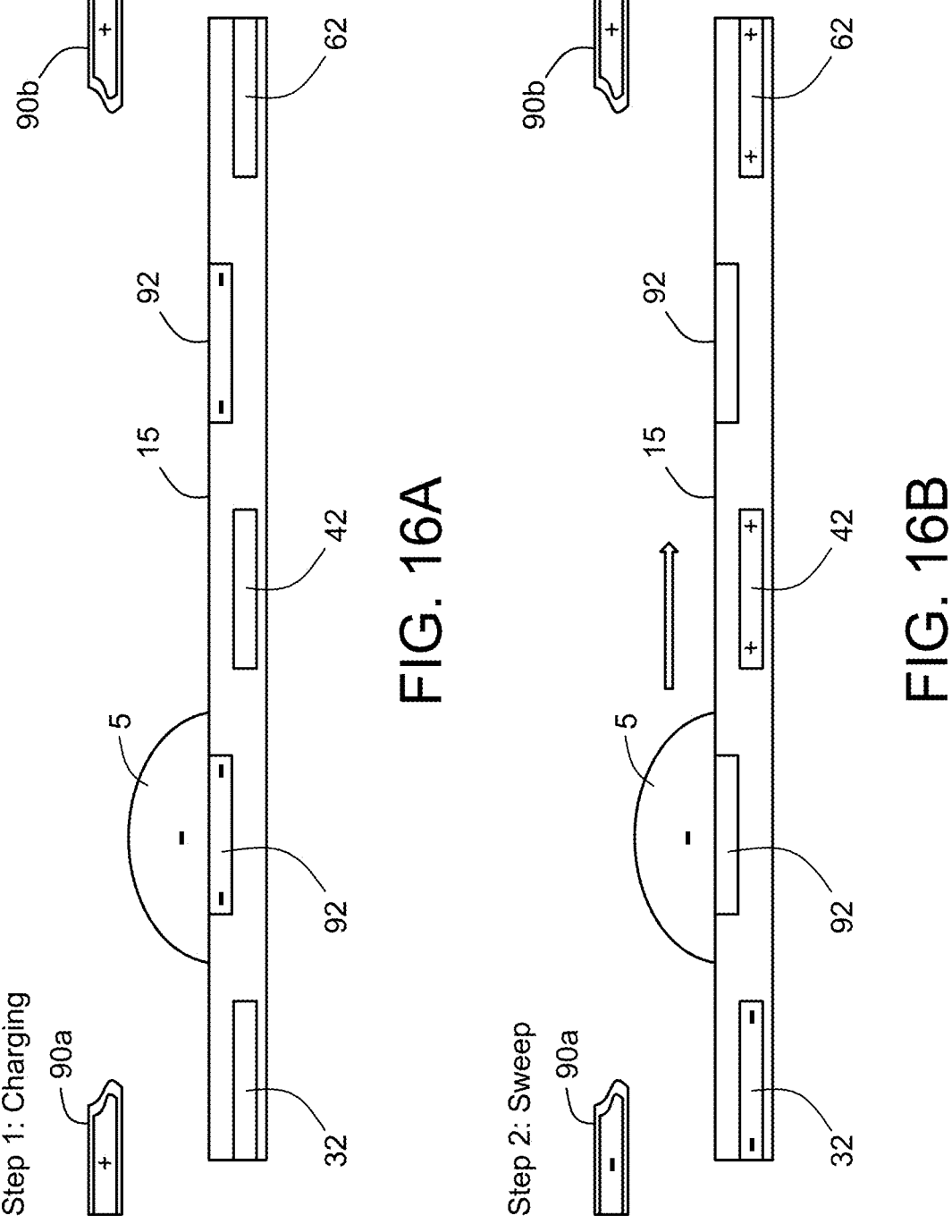
FIGS. 16A and 16B are a pair of graphic representations of the electric charging imposed on a water droplet following sweeping of the water droplet.

Having exposed electrodes/fingers 92 can be useful because the exposed electrode fingers 92 can transfer charge by ionization of the water droplets in contact. FIGS. 16A and 16B show interdigitated exposed electrodes 92 on the surface 15 of interest. Additional insulated electrodes 90a and 90b are placed in the perimeter above the de-wetting surface 15 and the insulated interdigitated electrode fingers 32, 42, and 62 are below the surface 15. The first step of the process is to apply a voltage differential between the exposed electrode fingers 92 and the perimeter electrodes 90a and 90b. Charge transfer occurs between the exposed electrode fingers 92 and the water droplets. The second step involves sweeping the droplets 5 swept by an appropriate sequence of powering and potential on the insulated interdigitated electrode fingers 32, 42, and 62. Electrophoretic phenomenon is the principle that appropriately describes the resulting forces on the charged water droplet 5.

Figure 17:
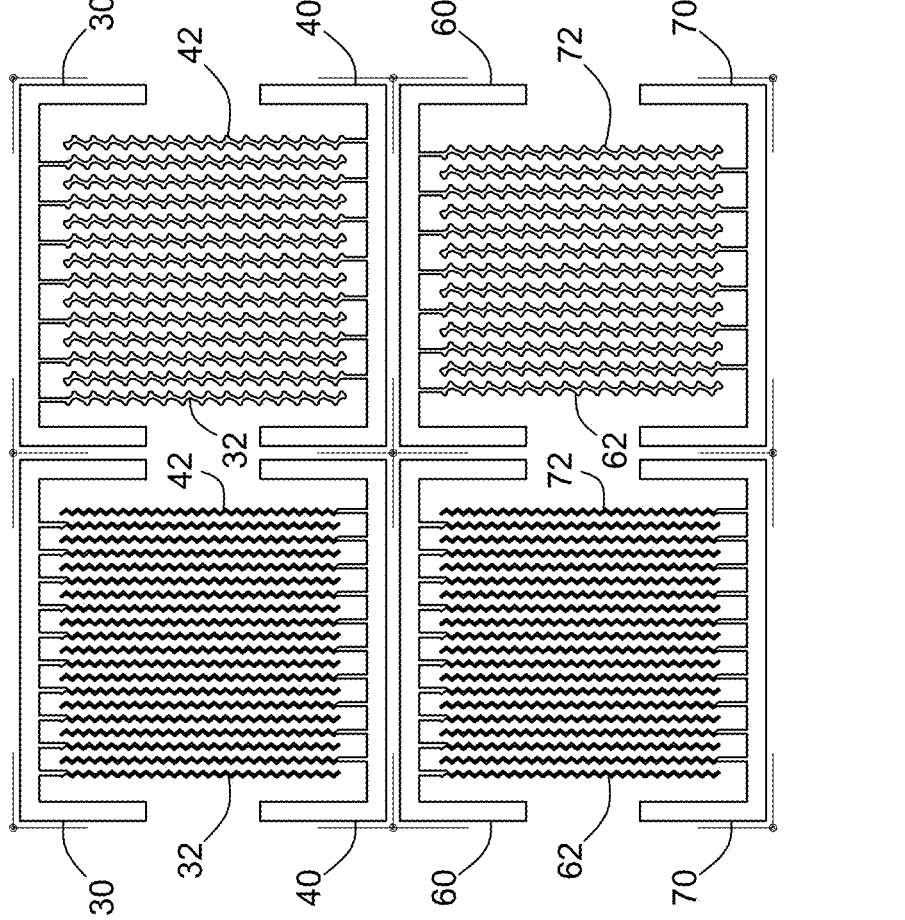
FIG. 17 is a top view of a pattern of electrode fingers that are crenelated.

The electrode fingers may also be crenelated as shown in FIG. 17. Fingers without crisp lines increase the density of gap lines, the number of gaps, effective length of gap lines, or the area to which droplets are attracted. Spikes on the electrode fingers are also helpful for creating inhomogeneous electric fields that create unbalanced forces that may propel water droplets 5. Droplets 5 will stop moving at boundaries, and if the boundary is spiky, the droplet will continue to be pulled to the end of the spikes, which in some crenelated designs, can pull the droplet 5 onto the start of the next electrode, thus preventing the droplet 5 from getting stuck.

The sizes of the fingers 32, 42, 62, and 72 and gap widths may also be progressively changing. This may increase droplet sweeping efficiency. For example, sweeping could start from narrower fingers/gaps to larger fingers/gaps to sweep droplets 5 more efficiently as they start small and get bigger and bigger as they continue to move across the fingers and gaps.

It is also possible for combining/grouping individual fingers 32, 42, 62, and 72 to make effectively larger fingers. Progressively more and more individual fingers could be powered together simultaneously/identically to efficiently move droplets as they grow or "snowball" along across the electrode fingers.

Thin-Film Transistors (TFTs) are an option for creating active electrode patterns on a surface of a supporting substrate 12 such as glass or clear polyimide. The electrode pattern can be pixelized and differential voltage can be applied between a pair or group of pixels to move droplets in arbitrary directions. TFTs allow for on-substrate integrated circuits, which enable applications requiring large area or high channel count. TFTs can also be used to reduce the number of contacts needed.

Figures 18, 19:
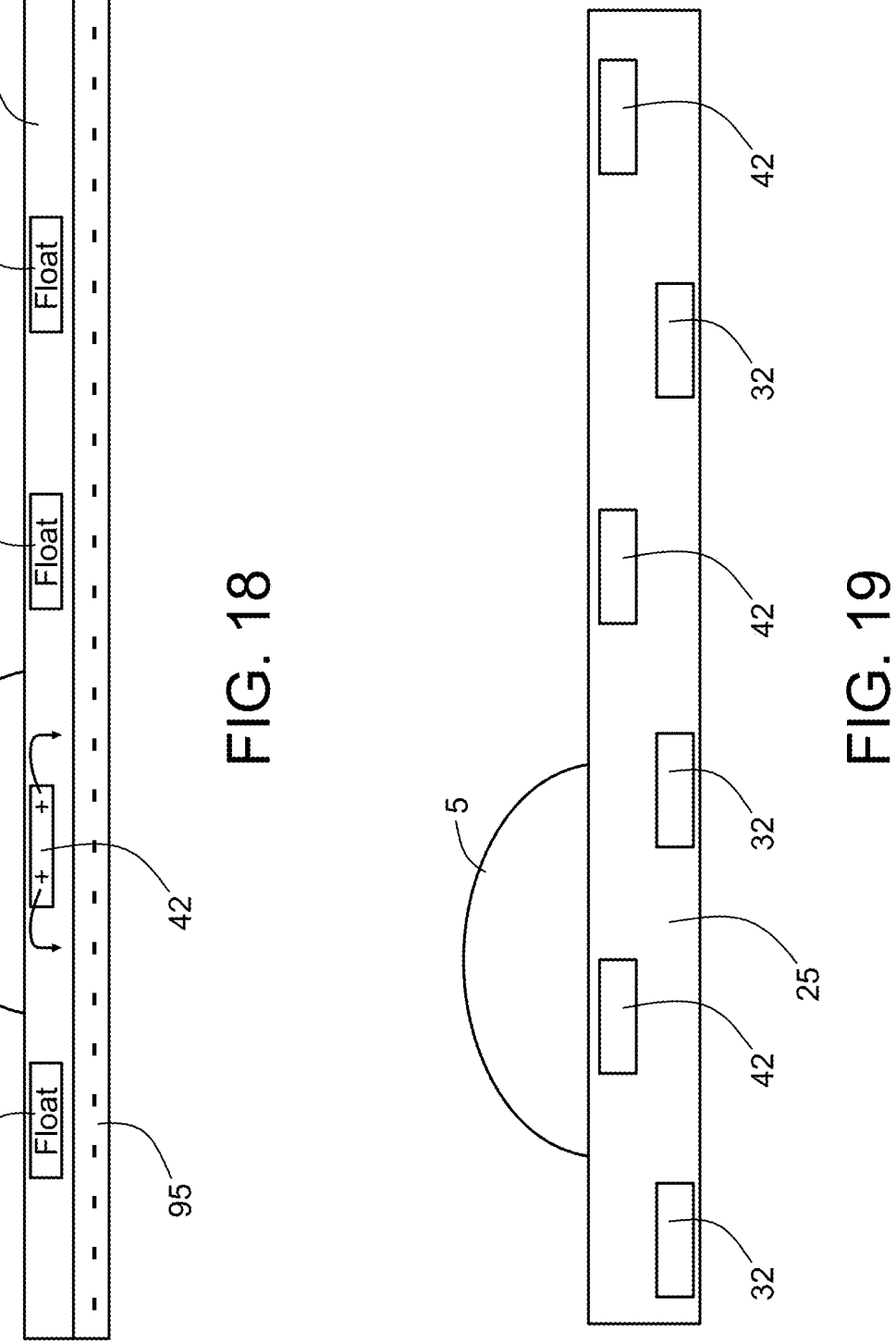
FIG. 18 is a graphic illustration of an example of a layered in-plane geometry IDE with an isolated ground plane underneath.
FIG. 19 is a graphic illustration of an example of a layered parallel geometry.

Layered geometries of the electrode fingers 32, 42, 62, and 72 could also be used. An example of a layered geometry is an in-plane geometry IDE with an isolated ground plane 95 underneath as shown in FIG. 18. Additional electrode fingers 32, 42, 62, and 72 or a conducting plane 95 may also be placed in distinct layers on the surface separated by an insulating material or dielectric 25. For example, FIG. 18 shows a co-planar geometry. A conducting plane 95 is placed below the interdigitated electrode. Inhomogeneous fields where droplets are attracted are created by powering individual electrodes with opposite polarity to the conducting plane 95 and leaving its neighboring electrode floating.

Another example of a layered geometry is a layered parallel geometry. When power is applied, electrode fingers 32 may have regions of zero or homogeneous fields such as in the middle of an electrode finger or at the middle of a gap, respectively. Hence, droplets that are located in those regions may not experience conglomerating or sweeping forces. A method to minimize those regions with little field inhomogeneity is to add another underlying layer of electrode fingers 42 offset from the first pattern as shown in FIG. 19.

Figure 20:
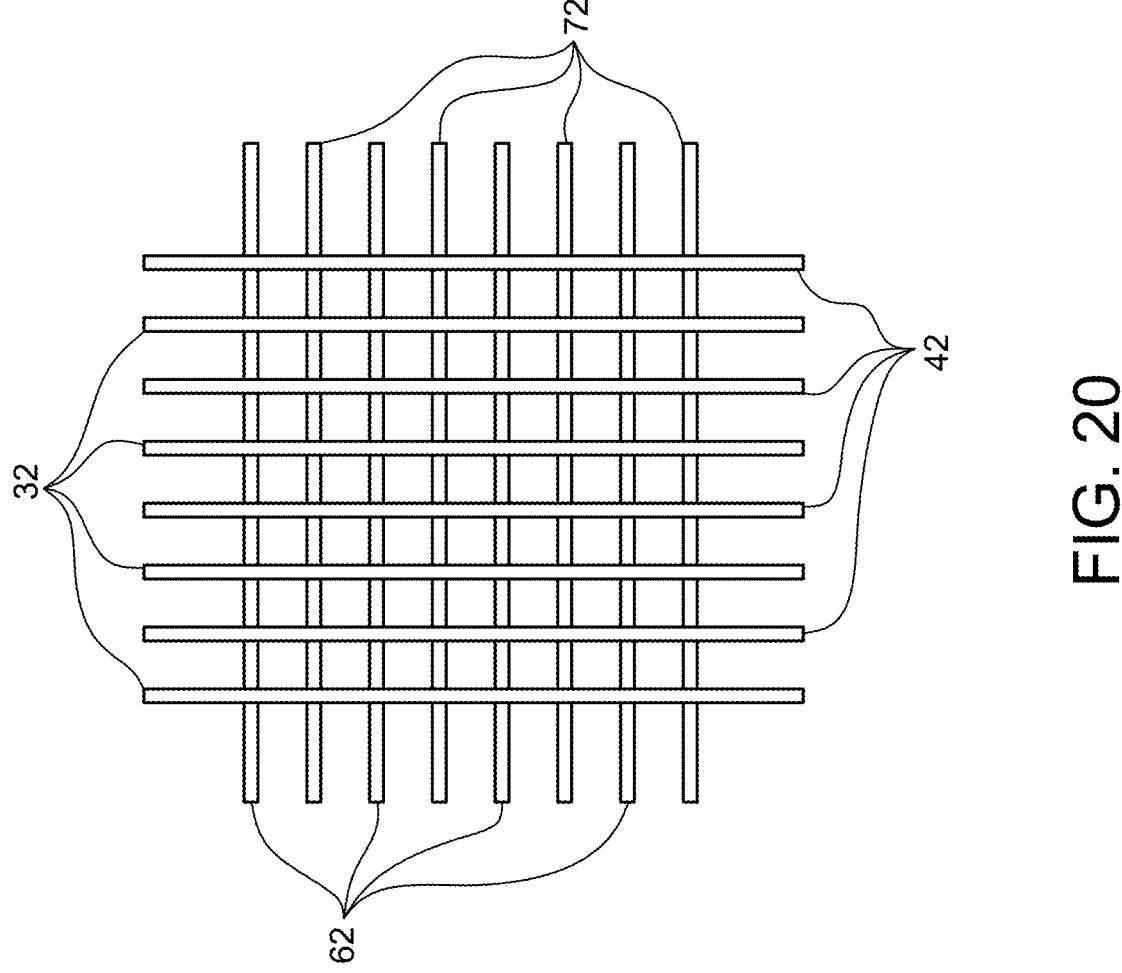
FIG. 20 is a top view of a layered hash pattern of electrode fingers.

Still another example of a layered geometry is a layered hash. Additional underlying electrode fingers 62 and 72 need not be parallel to the first layer pattern of electrode fingers 32 and 42. The interdigitated layers may be orthogonal to each other as shown in FIG. 20. This "hash" pattern allows for multi-directional sweeping of droplets.

Another geometry that may be used is a reverse-coated geometry. The last layer is covered with electrodes, flipped over, and then bonded to the substrate with the electrodes sandwiched between the last layer and the substrate. Electrodes, e.g. ITO, PDOT, graphene, may be coated on the back side of the first layer (e.g. glass, parylene).

Other geometries include: stacked IDEs (IDE|Dielectric|IDE); stacked IDE with slight angle shift between; and tiled agglomeration (Tiled IDE), which avoids larger capacitance.

Figure 21:
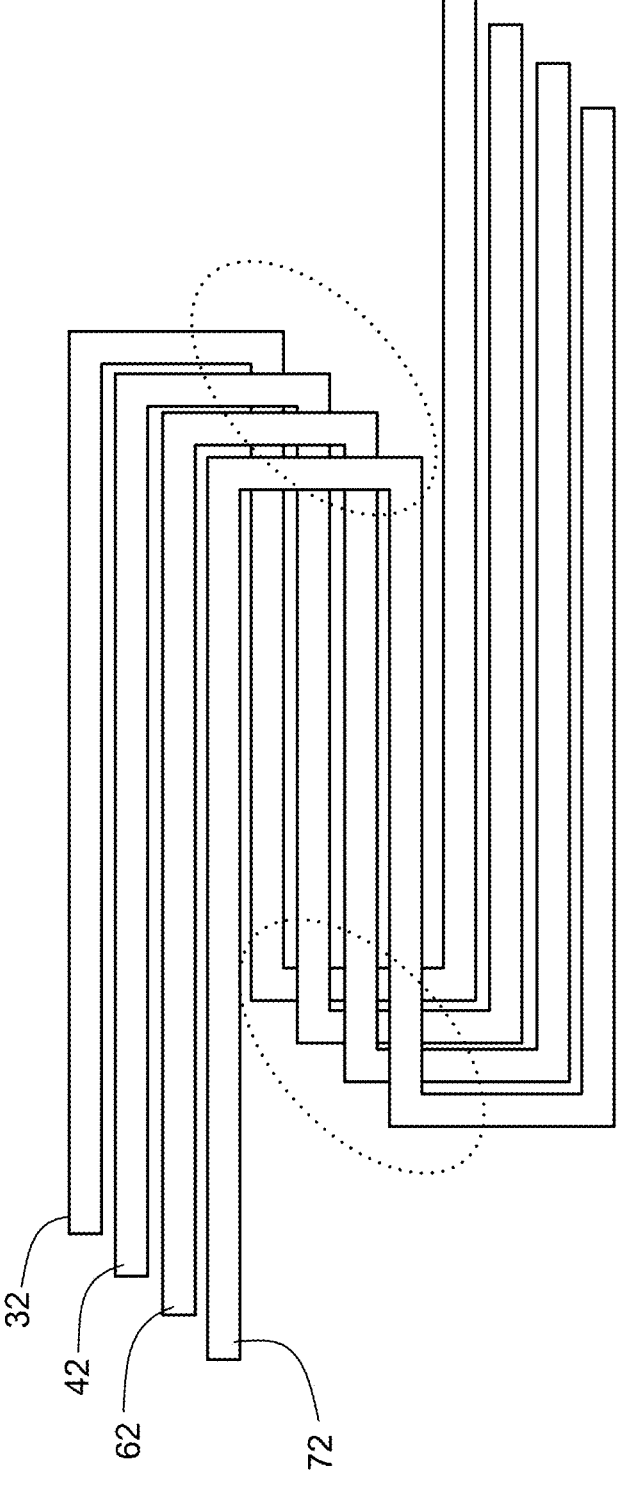
FIG. 21 is a top view of an overlapping pattern of electrode fingers.

Having described various geometries of the electrodes, various forms of connections of the electrodes are now described. One such connection is overlapped linkage or bypassed crossing electrodes. Electrode fingers may be grouped together by shorting the overlaps, and thereby providing overlapped linkage. Electrically insulated crossings between electrodes, bypassed crossings, may be achieved by placing a layer of high dielectric strength material between the overlapping electrodes. These are useful methods of grouping or bypassing electrode fingers 32, 42, 62, and 72 that have a spiral or overlapping geometry such as shown in FIG. 21. Other connections may be made by vias or asymmetric conductive films (ACFs).

A heater may be employed in combination with electrowetting. This may be useful if the surface 15 is exposed to snow and ice such that the heater melts the snow and ice turning it to water that may then be removed using the methods described above.

Figure 22:
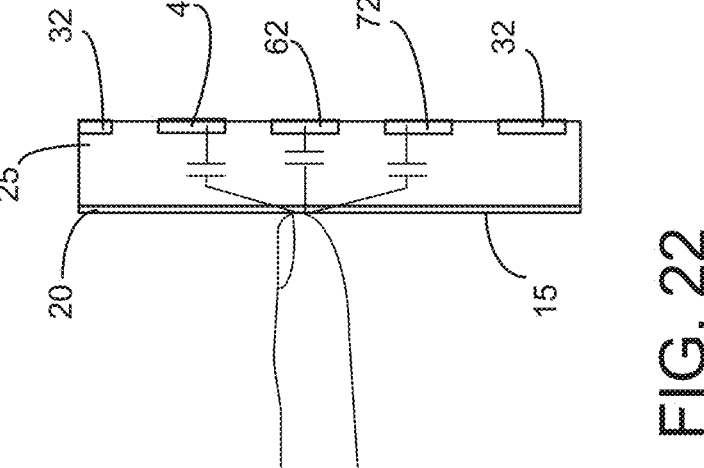
FIG. 22 is a graphic illustration of the use of the optical device as a capacitive touch surface.

Also, it may be desirable to utilize the capacitive sensing, triggering capability of the device. An IDE is basically a capacitor. Contaminants and droplets on the surface of the electrowetting device change the effective capacitance measured in the device via capacitive coupling and change effective dielectric constant due to an additional layer of water and contaminants. An example is shown in FIG. 22. This inherent capacitive sensing ability of the eWASH may be used to trigger a voltage sweep of the device or a water spray, an air puff, and other complementary or supplementary cleaning procedures. The capacitive sensing ability may be used to trigger internal and external processes within and outside the eWASH surface. In other words, the plurality of interdigitated fingers provide for capacitive sensing of droplets on the outer surface, and the drive circuit is configured to applying the signals to the plurality of electrodes in response to the capacitive sensing of droplets on the outer surface.

Figures 23A, 23B, 24A, 24B:
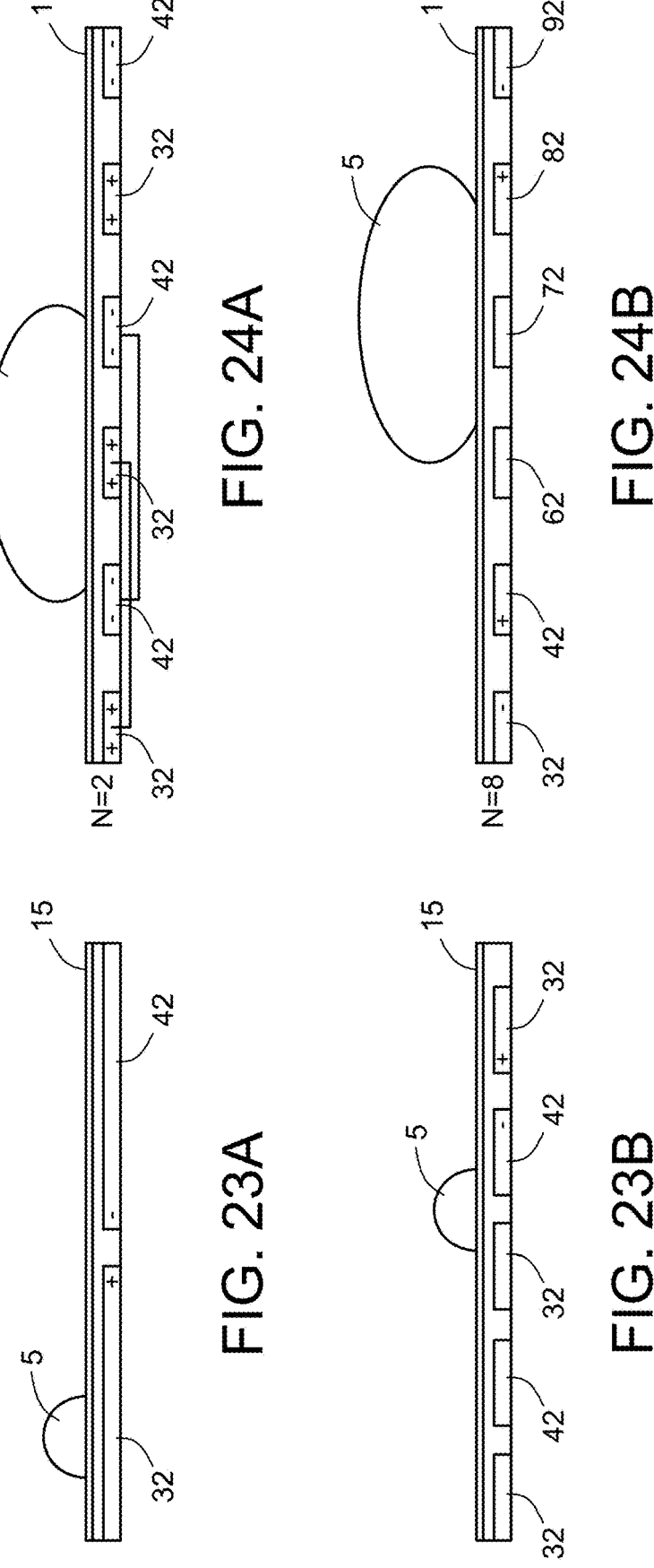
FIGS. 23A and 23B are a pair of graphic representations of the electric fields imposed on a small water droplet with a large pitch and a smaller pitch.
FIGS. 24A and 24B are a pair of graphic representations of the electric fields imposed on a large water droplet with different number of independent electrodes, N=2 and N=8.

In the following embodiments, the electrodes are provided in a single plane and there are gaps between the electrodes. In such an arrangement, the following metric allows for a variety of droplet sizes to be actively and efficiently swept.

$$Pitch < Droplet\ Diameter < N*Pitch,$$

where N is the number of independently activated electrode fingers per tile and pitch is the distance between the centers of adjacent electrode fingers, which are uniformly sized and spaced. FIGS. 23A and 23B show the impact of the pitch on a small droplet 5. In FIG. 23A, the pitch between adjacent electrodes is larger than the diameter of the droplet 5. With such a large pitch, it may be difficult to move the droplet 5. In FIG. 23B, the pitch is smaller thereby making it easier to sweep the small droplet 5. In FIG. 24A, a larger droplet is shown and the pitch the same as in FIG. 23B but is smaller than the diameter of the droplet. The example shown in FIG. 24A has two independently activated electrodes 30 and 40 (N=2) each having fingers 32 and 42, respectively. Thus, there are two electrode fingers 32 and 42 per tile. Because the tile size is relatively small compared to the droplet moving the larger droplet 5 may be a challenge. In FIG. 24B, the number of independently activated electrodes is N=8 for eight electrode fingers 32, 42, 62, 72, 82, 92 per tile with a change in phase every 4 electrode fingers. The larger tile size is more effective in moving the larger droplet 5. However, to move smaller droplets, it is beneficial to perform sweeping as described further below.

The inventors have discovered that smaller pitches are better since they can move smaller droplets more effectively and may still move larger droplets particularly when the concept of "tiling" is employed to group sets of electrode fingers together. Thus, the pitch may be equal or less than 750 µm, or more preferably equal or less than 200 µm, or even more preferably equal or less than 100 µm.

Tiling or creating replicas of a limited number (N) of active independent electrodes is a novel technique used to construct a larger active area out of a small number of independent electrodes. Tiling makes the technology scalable to large areas. Tiling is executed by connecting sets of electrode fingers (see sets A-G in FIG. 27) with a bus wire/conductive connector 18. By tiling, whatever voltage is set on any one individual electrode finger, for example electrode finger 1 of set A, is replicated in electrode finger 1 on the rest of the electrode sets B-G. With tiling, sweeping of an active area 17 of the outer surface 15 occurs simultaneously on multiple sweeping fronts. FIGS. 25A, 25B, 26A, and 26B illustrate the sweeping motion of shaded and unshaded sections (or tiles). Droplets are attracted to the boundary between shaded and unshaded sections where the electric fields are present.

Figure 28:
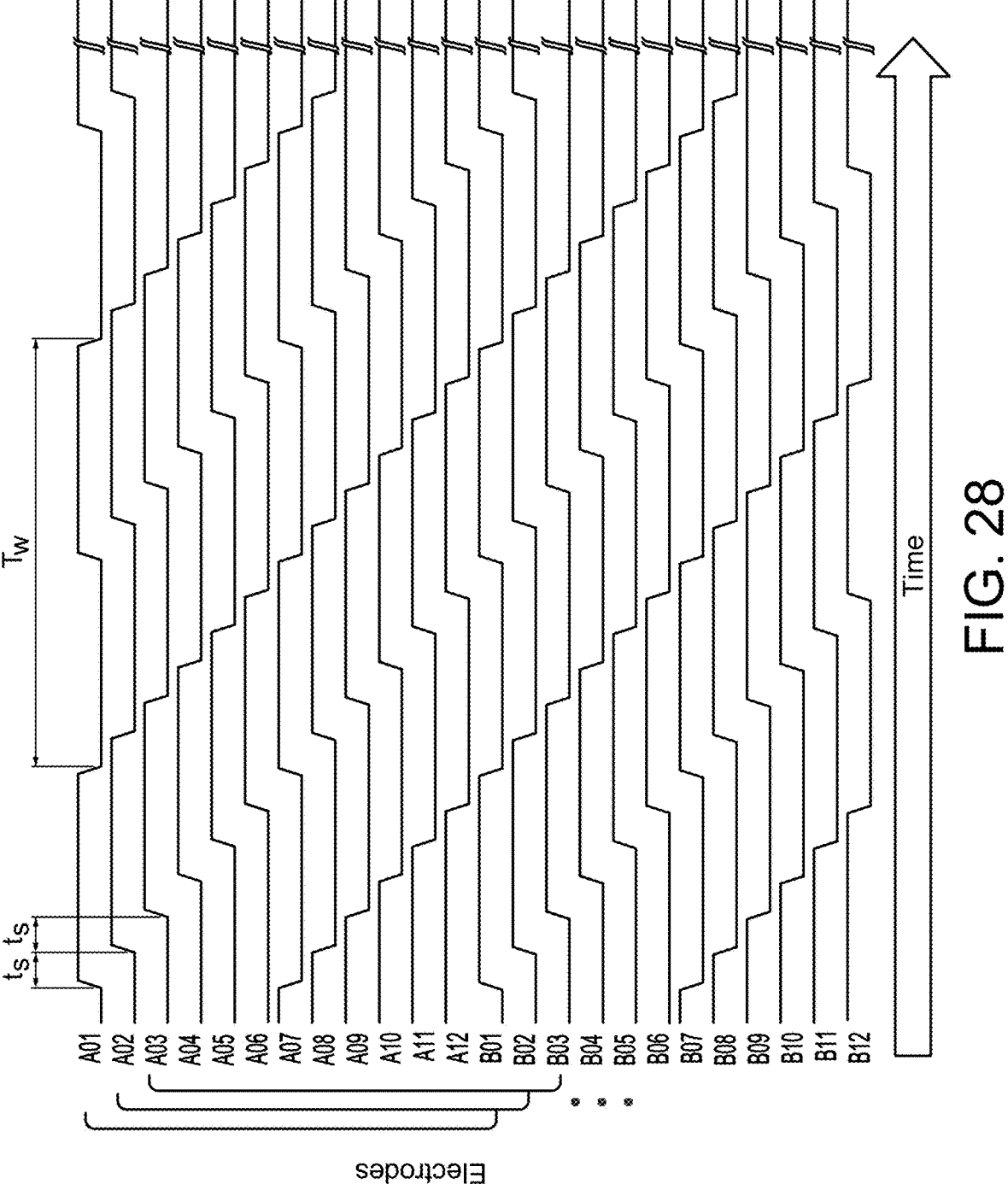
FIG. 28 is a third timing chart showing the phase modulation signals used to modulate an AC signal to generate phase-modulated signals delivered to each of the interdigitated electrode fingers shown in FIG. 27.

Despite tiling making sections of the active area 17 be a mirror other sections, a novel sequential voltage operation is created on the electrodes such that the droplet 5 is acted upon by a continuous pull all throughout the area of the active area 17 even if what is occurring on each section is identical to other sections. One key to creating an effectively continuous sweep on all the electrodes is to make the integer multiples of the voltage signal period or powering-cycle on an electrode finger be equal to the time for the whole sweep signal/pattern to spatially go across a set of electrode fingers. Once this protocol is applied on all sets, a fluid droplet 5 positioned on the first set corresponding to a section will be swept, as if continuously, as it moves along through all sets of electrode fingers. The continuous sweeping effect is illustrated by the timing diagram shown in FIG. 28, which shows phase modulation signals used for each electrode to modulate the phase of an AC signal such that phase-modulated AC signals are applied to each electrode. In FIG. 28, the modulations signals are either low or high which represents in-phase and anti-phase, respectively. For purposes of description, each electrode may be identified by an order reference n (where n=1 to N and N is the total number of individually activated electrodes). Each electrode has a plurality of electrode fingers inherits the reference number of its electrode. The electrode fingers being arranged in a repeating sequential order from 1 to N for each tile A, B, C, . . . Each electrode 1–N is driven by a corresponding phase-modulated AC signal. Each phase-modulated AC signal is generated from a single AC signal that is phase-modulated separately for each electrode using the corresponding number N of phase modulation signals shown in FIG. 28, for example. Thus, each phase modulation signal may also be identifiable by the order reference n (where n=1 to N) to correspond to the respective electrodes. Each phase modulation signal periodically imposes phase shifts to the AC signal back and forth between an in-phase state (e.g., 0°) and an anti-phase state (e.g., 180°) with a period of $T_w$. The phase shifts in each phase modulation signal n are delayed in time by time step $t_s$ from the phase shifts in the sequentially preceding phase modulation signal n−1 such that the droplets are continuously swept in a predetermined direction across the outer surface.

Figure 27:
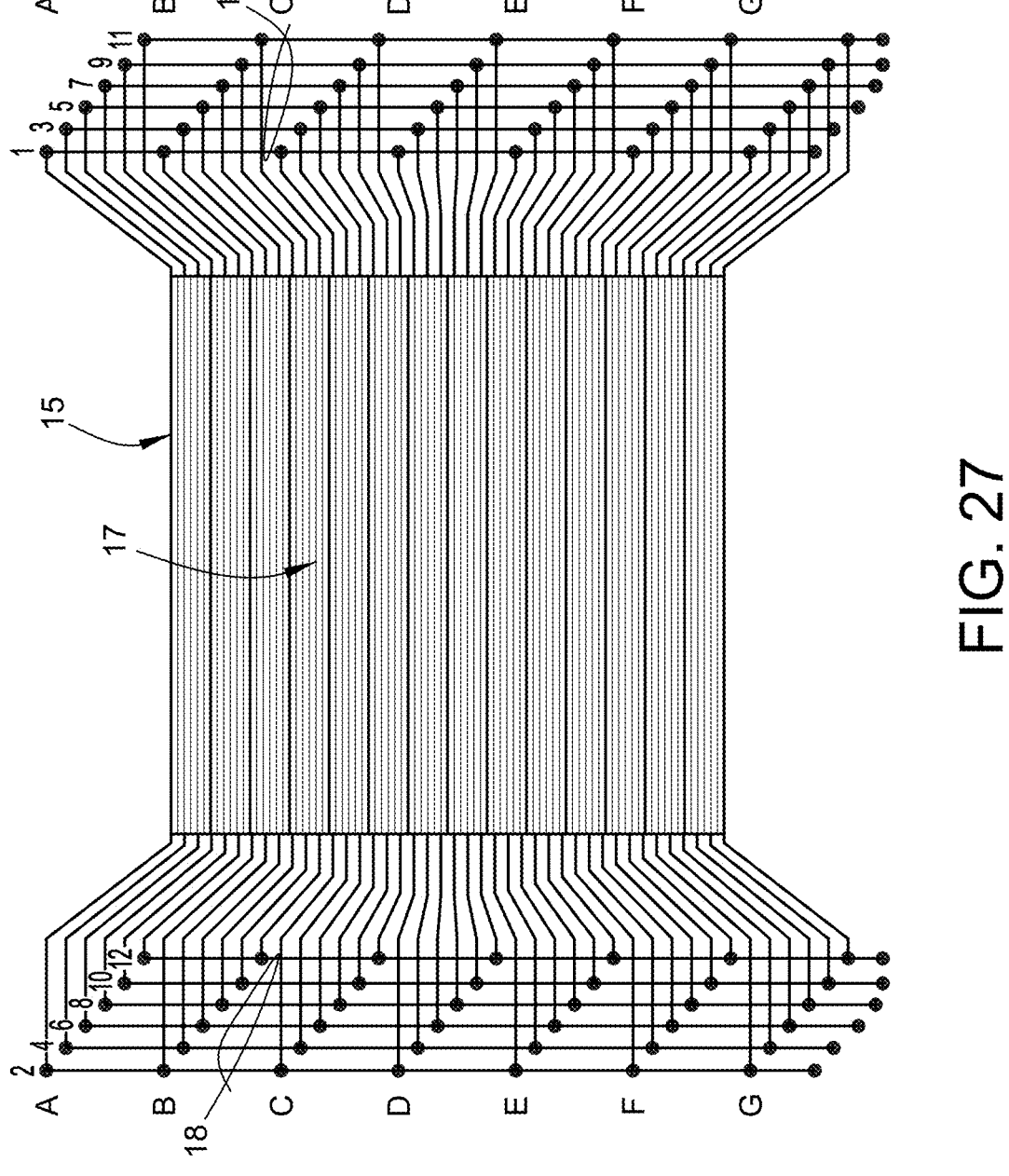
FIG. 27 is a top view of an active area of an eWash surface showing how 7 sets (A-G) tiled electrodes are connected.

In the example shown in FIG. 27, the electrode fingers for twelve independently controlled electrodes (N=12) are provided for each set of electrodes (or tiles) A-G and the phase-modulated AC signals applied to each finger are identical but are at an in-phase state or an anti-phase state as determined by the phase modulation signals shown in FIG. 28 for each electrode. To provide continuous sweeping, for any number N of independently activated electrodes, the time step $t_s$ would be $t_s=T_w/N$. The values of $t_s$ and $T_w$ may vary over time. Thus, the droplet will continue to be swept from the Nth finger of tile A to the $1^{st}$ finger of tile B. If the timing criteria ($t_s=T_w/N$) is not met, this "handoff" between tiles is like a sweeping discontinuity. As an example, the AC signal may have a frequency of 500 Hz, the number independently activated electrodes N is 12, and the phase modulation signal may have a period $T_w$ of 24 ms. In this case the time step $t_s$ would be 2 ms. For a square wave phase modulation signal that imposes a phase of either 0° or 180° to the AC signal at any moment in time, the progression of the 0°/180° phase offset moves from one pair of fingers to the next pair every $t_s$ (e.g., 2 ms). An added benefit of the in-phase/anti-phase (0°/180° phase) choice is that it allows twice higher effective voltages, while minimizing the voltage supplied by the driver. The higher the voltage for a driver, the more complexity and cost. Using the example of N=12 and phase shifts of 0° or 180°, the following table shows the phase shifts applied to the AC signal for each of the 36 electrode fingers (3 fingers per electrode) at time intervals $t_s$ over one period $T_w$:

| Finger | Time Intervals | | | | | | | | | | | |
|---|---|---|---|---|---|---|---|---|---|---|---|---|
| | 0 | $t_s$ | $2t_s$ | $3t_s$ | $4t_s$ | $5t_s$ | $6t_s$ | $7t_s$ | $8t_s$ | $9t_s$ | $10t_s$ | $11t_s$ |
| A01 | 0 | 180 | 180 | 180 | 180 | 180 | 180 | 0 | 0 | 0 | 0 | 0 |
| A02 | 0 | 0 | 180 | 180 | 180 | 180 | 180 | 180 | 0 | 0 | 0 | 0 |
| A03 | 0 | 0 | 0 | 180 | 180 | 180 | 180 | 180 | 180 | 0 | 0 | 0 |
| A04 | 0 | 0 | 0 | 0 | 180 | 180 | 180 | 180 | 180 | 180 | 0 | 0 |
| A05 | 0 | 0 | 0 | 0 | 0 | 180 | 180 | 180 | 180 | 180 | 180 | 0 |
| A06 | 0 | 0 | 0 | 0 | 0 | 0 | 180 | 180 | 180 | 180 | 180 | 180 |
| A07 | 180 | 0 | 0 | 0 | 0 | 0 | 0 | 180 | 180 | 180 | 180 | 180 |
| A08 | 180 | 180 | 0 | 0 | 0 | 0 | 0 | 0 | 180 | 180 | 180 | 180 |
| A09 | 180 | 180 | 180 | 0 | 0 | 0 | 0 | 0 | 0 | 180 | 180 | 180 |
| A10 | 180 | 180 | 180 | 180 | 0 | 0 | 0 | 0 | 0 | 0 | 180 | 180 |
| A11 | 180 | 180 | 180 | 180 | 180 | 0 | 0 | 0 | 0 | 0 | 0 | 180 |
| A12 | 180 | 180 | 180 | 180 | 180 | 180 | 0 | 0 | 0 | 0 | 0 | 0 |
| B01 | 0 | 180 | 180 | 180 | 180 | 180 | 180 | 0 | 0 | 0 | 0 | 0 |
| B02 | 0 | 0 | 180 | 180 | 180 | 180 | 180 | 180 | 0 | 0 | 0 | 0 |
| B03 | 0 | 0 | 0 | 180 | 180 | 180 | 180 | 180 | 180 | 0 | 0 | 0 |
| B04 | 0 | 0 | 0 | 0 | 180 | 180 | 180 | 180 | 180 | 180 | 0 | 0 |
| B05 | 0 | 0 | 0 | 0 | 0 | 180 | 180 | 180 | 180 | 180 | 180 | 0 |
| B06 | 0 | 0 | 0 | 0 | 0 | 0 | 180 | 180 | 180 | 180 | 180 | 180 |
| B07 | 180 | 0 | 0 | 0 | 0 | 0 | 0 | 180 | 180 | 180 | 180 | 180 |
| B08 | 180 | 180 | 0 | 0 | 0 | 0 | 0 | 0 | 180 | 180 | 180 | 180 |
| B09 | 180 | 180 | 180 | 0 | 0 | 0 | 0 | 0 | 0 | 180 | 180 | 180 |
| B10 | 180 | 180 | 180 | 180 | 0 | 0 | 0 | 0 | 0 | 0 | 180 | 180 |
| B1123 | 180 | 180 | 180 | 180 | 180 | 0 | 0 | 0 | 0 | 0 | 0 | 180 |
| B12 | 180 | 180 | 180 | 180 | 180 | 180 | 0 | 0 | 0 | 0 | 0 | 0 |

-continued

| Finger | Time Intervals | | | | | | | | | | | |
|---|---|---|---|---|---|---|---|---|---|---|---|---|
| | 0 | $t_s$ | $2t_s$ | $3t_s$ | $4t_s$ | $5t_s$ | $6t_s$ | $7t_s$ | $8t_s$ | $9t_s$ | $10t_s$ | $11t_s$ |
| C01 | 0 | 180 | 180 | 180 | 180 | 180 | 180 | 0 | 0 | 0 | 0 | 0 |
| C02 | 0 | 0 | 180 | 180 | 180 | 180 | 180 | 180 | 0 | 0 | 0 | 0 |
| C03 | 0 | 0 | 0 | 180 | 180 | 180 | 180 | 180 | 180 | 0 | 0 | 0 |
| C04 | 0 | 0 | 0 | 0 | 180 | 180 | 180 | 180 | 180 | 180 | 0 | 0 |
| C05 | 0 | 0 | 0 | 0 | 0 | 180 | 180 | 180 | 180 | 180 | 180 | 0 |
| C06 | 0 | 0 | 0 | 0 | 0 | 0 | 180 | 180 | 180 | 180 | 180 | 180 |
| C07 | 180 | 0 | 0 | 0 | 0 | 0 | 0 | 180 | 180 | 180 | 180 | 180 |
| C08 | 180 | 180 | 0 | 0 | 0 | 0 | 0 | 0 | 180 | 180 | 180 | 180 |
| C09 | 180 | 180 | 180 | 0 | 0 | 0 | 0 | 0 | 0 | 180 | 180 | 180 |
| C10 | 180 | 180 | 180 | 180 | 0 | 0 | 0 | 0 | 0 | 0 | 180 | 180 |
| C11 | 180 | 180 | 180 | 180 | 180 | 0 | 0 | 0 | 0 | 0 | 0 | 180 |
| C12 | 180 | 180 | 180 | 180 | 180 | 180 | 0 | 0 | 0 | 0 | 0 | 0 |

The combination of conglomeration and sweep cycle is a novel idea. By conglomerating smaller droplets into larger ones, sweeping may be more effective.

A conglomeration cycle is the application of voltage such that the overall voltage pattern does not move, on average, in a particular direction. The sweep cycle is a voltage pattern that is spatially shifting towards a direction in time. With a sweep cycle, an instantaneous or average speed can be defined to the overall voltage pattern. In a conglomeration cycle, there may be motion for individual parts of the pattern but the overall pattern of voltages in the active area does not shift in space.

In the present application for clearing and cleaning droplets of fluid, both a conglomeration cycle and a sweep cycle can be used. The sweep cycle is already described above and illustrated in FIGS. 27 and 28. The conglomeration cycle is where an AC or DC field is applied by applying voltage differences across two electrodes or across groups of electrodes. Recall that droplets are attracted to a region where a differential voltage occurs. That conglomeration cycle allows multiple droplets to get attracted to that region with a differential voltage and droplets can get larger by conglomerating or combining with each other. For conglomeration, every other electrode finger may be at an opposite phase and thus only two channels may be needed. For sweeping, more independent channels are better and such an arrangement can still perform conglomeration.

An AC sweep is distinct from a DC voltage that is being swept across electrodes or voltage channels. An AC sweep means that the polarity of each electrode has flipped one or more times before the sweep pattern has spatially moved over to the next electrode. Note that the next electrode does not necessarily mean the adjacent electrode. AC sweeps are more effective in (1) avoiding charge accumulation on the electrodes which can cause pinning, (2) dislodging droplets from pinning points due to droplet vibration during AC sweep, and (3) pushing droplets as well as attracting droplets. It should also be noted that briefly shorting an electrode that has been driven with a DC voltage may not be sufficient to remove an accumulating charge from the outer surface. However, when using an AC voltage, the voltage changes from positive to negative with no net charge on the surface so the average voltage is zero.

Figure 30:
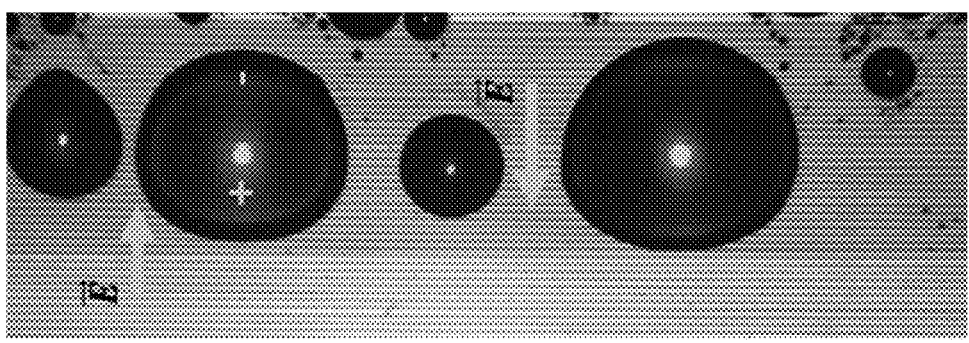
FIG. 30 is a photograph of a top view of drops being pushed by electric fields.
Figure 29:
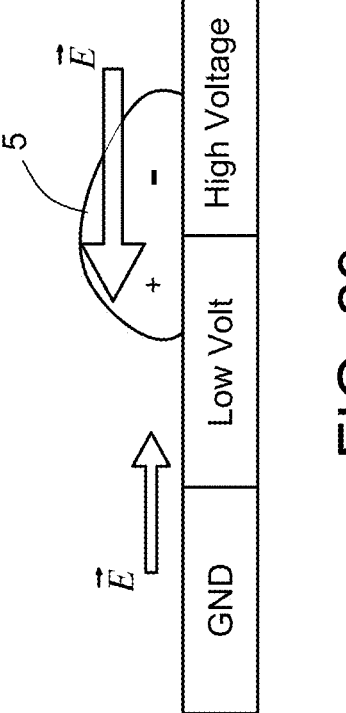
FIG. 29 is a graphic side view illustration of electric fields imposed on a droplet being pushed by electric fields.

Pushing droplets is possible with AC sweeping. Pushing/repulsing droplets instead of attracting them is a novel idea. When the fields or voltages are in DC, water droplets with a fixed dipole orientation reorient with a nearby DC with dipole moment anti-parallel or angled to a field. With AC voltage or AC field sweeping, a portion of a droplet can reorient its dipole, but every reorientation causes a moment of increase in potential energy overall within the droplet. That increase is associated with a repulsive force to the induced dipole on the water droplet. Here, as shown in FIGS. 29 and 30, ground (GND) is a voltage level between low and high voltage. By using the intermediate ground voltage to push droplets 5, the field created from the ground electrode is not as strong as the field created by the voltage difference across high-low voltage electrodes. This means that the field across high-low voltages is strong enough to keep the dipole orientation fixed while the electric field from the ground electrode provides a push but not enough to flip the dipole orientation.

Figure 31:
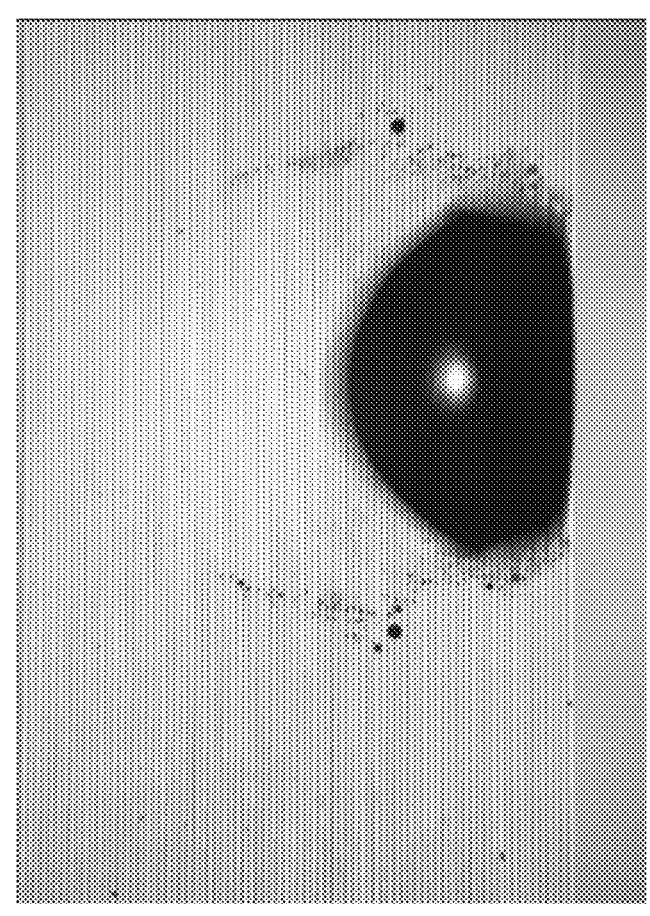
FIG. 31 is a photograph of a drop at the edge of an active area of the eWash surface.

There is a clear advantage to expanding the area of first and last electrodes 16 and 19 so that droplets are not repulsed on the first or last electrode (depending on the direction of the sweep). FIG. 31 shows an example of the repulsion of droplet on the end of the last electrode or repulsion from outside the active area.

Figure 32:
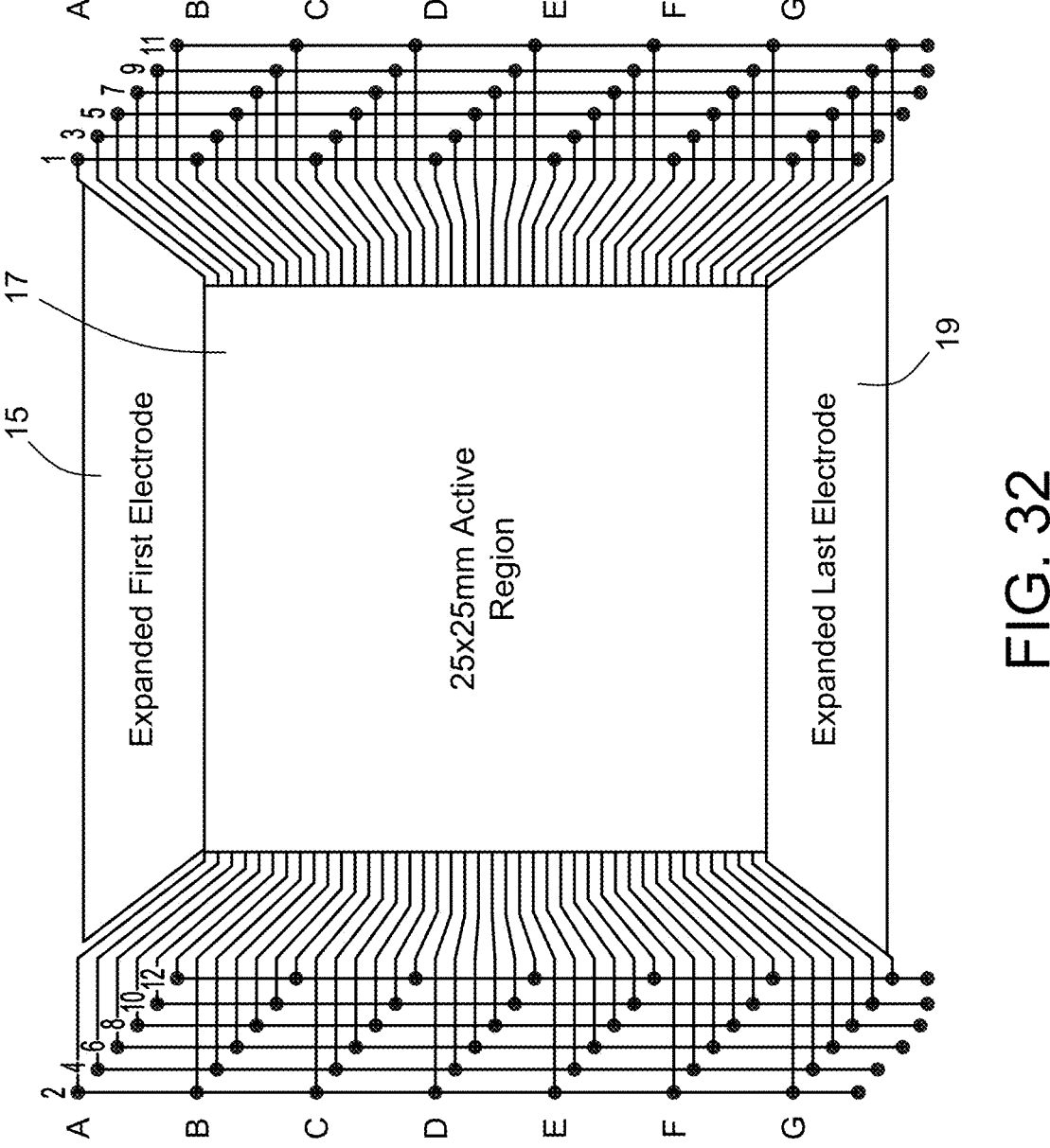
FIG. 32 is a top view of an active area of an eWash surface shown with the connection of the electrode fingers and also having expanded the area of the first and last electrode fingers.

The explanation for this is like the droplet pushing effect. Here instead, the area outside the electrode is grounded so the field from outside the active area to the end electrode opposes the dipole induced in the water droplet. To avoid that repulsion at the end of the sweep, one can expand the area of the last electrode (or first electrode depending on direction of sweep) as shown in FIG. 32. That creates an equipotential surface outside the active region so that no forces due to electric field will stop the droplet from sliding beyond the active region during operation.

In addition to or as an alternative to the expanded first and last electrodes 16 and 19, those regions could be coated with a hydrophilic material so as to draw the droplets 5 off of the active area 17. In other words, a hydrophilic coating may be located proximate an edge of the outer surface to where the droplets are swept.

Note, the outer surface layer does not need to be just hydrophobic. It could be omni-phobic. We could move oils and other droplets as well, e.g., ice droplets or snowflakes. With various patterns of droplet phobic or -philic, droplets can be collected from as reservoir or sinked to a location within or outside the active region.

The driver circuit 50 may be configured to variably adapt a frequency of the AC signals to vary a speed at which the droplets are swept across the outer surface. For example, the speed of the sweep may be adjusted between about 20-40 mm/sec by changing frequency between about 400 Hz and 1 KHz. The period of the AC signal may be selected such that each period causes movement of the droplet the distance of one electrode finger. The speed of the droplet sweep may be adapted to be the terminal velocity of the droplets.

Another means of controlling water droplets on a surface is through the use of patterned hydrophobicity. If a water droplet lands on the boundary between a more hydrophobic area and a less hydrophobic area, then the droplet will typically move toward the less hydrophobic area. This can be utilized to passively channel droplets (or induce them to condense) into a smaller area to force droplets to merge, which helps form larger droplets in addition to conglomeration or sweeping. For example, one could have alternating stripes of more hydrophobic layers and less hydrophobic layers. If the less hydrophobic areas are too hydrophilic, it is not ideal because then the water will wet out too much and not bead up and fall off/be driven off the glass, or it may interfere with sweeping. Another embodiment would be a checkerboard pattern of more hydrophobic and less hydrophobic areas, or less hydrophobic "spots" on a more hydrophobic background. In each case the goal would be alternative methods to get more drops to merge. Hydrophobic patterning can be used independent of electrowetting or combined with it.

A hydrophobicity gradient is a continuous version of hydrophobic patterning that can be thought of as adjacent areas of more finely varied hydrophobicity, or a true gradient. The idea is that the droplets will tend to move easier in the direction of less hydrophobicity and this can be utilized to help drive droplets in the desired direction. The gradient may also be generated by a binary combination of two hydrophobicities, but patterned at a scale much smaller than the droplet, so the effective hydrophobicity is a gradient. The different hydrophobicities could be two spatially patterned coatings of different materials, the removal of a single coated material, or the surface patterning of a single substrate or coating material.

The hydrophobic layer 20 may be sprayed on, coated, or made by micro- and/or nano-structuring the surface. Possible hydrophobic materials include Teflon® AF; Optool UD120; Parylene AF4; Optool DSX; CYTOP; PDMS, Polyisobutylene (PIB), rare-earth ceramic oxides and Aquapel.

The substrate 12 may be made of any type of glass or plastic and may be rigid or flexible.

The electrodes may be made of indium tin oxide, which is a transparent ceramic conductor, or PEDOT, which is a transparent polymeric conductor.

The dielectric 25 may be made of: SU-8 (photoresist polymer); polymer-ceramic oxide composite; ultra-thin glass; ceramic oxides or nitrides (such as Al2O3, SiO2, Si3N4); or Parylene.

Although two to twelve electrodes are described above, it will be appreciated that any number of electrodes may be used.

The above lists of materials are not exhaustive as far as what could be used. The material requirements are that the electrodes are preferably sufficiently conductive (there is not a specific value that we know of for this property), the dielectric preferably does not allow surface water to reach the electrodes (and be electrically insulating), and the hydrophobic layer is preferably sufficiently hydrophobic. By definition, hydrophobic means a water contact angle >90 degrees. In some cases, both the hydrophobic and the dielectric functions can be achieved by a single layer of material.

It will be understood by one having ordinary skill in the art that construction of the described invention and other components is not limited to any specific material unless specified in the claims. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An optical element comprising:
a substrate having an outer surface on which droplets of fluid may form;
a number N of independently activated electrodes each identifiable by an order reference n (where n=1 to N), each electrode having a plurality of electrode fingers positioned proximate the outer surface and extending across an area of the outer surface, the electrode fingers being arranged in a repeating sequential order from 1 to N; and
a drive circuit for selectively applying phase-modulated AC signals to the electrodes, the drive circuit generates the phase-modulated AC signals by applying a number N of phase modulation signals to an AC signal with the number N of phase modulation signals equal to the number N of independently activated electrodes, each phase modulation signal also identifiable by the order reference n (where n=1 to N) to correspond to the respective electrodes, wherein each phase modulation signal periodically imposes phase shifts to the AC signal back and forth between an in-phase state and an anti-phase state with a period of $T_w$, wherein the phase shifts in each phase modulation signal n are delayed in time by time step $t_s$ from the phase shifts in the sequentially preceding phase modulation signal n–1 such that the droplets are continuously swept in a predetermined direction across the outer surface, wherein the time step $t_s$ is equal to $T_w/N$.

2. The optical element of claim 1, wherein the electrode fingers are arranged in a single plane with gaps therebetween.

3. The optical element of claim 1, wherein the electrode fingers are arranged with a uniform pitch, where the pitch is the distance between the centers of the electrodes, the pitch being less than or equal to 750 µm.

4. The optical element of claim 1, wherein the drive circuit is further configured to selectively apply a voltage potential between adjacent fingers in such a manner as to conglomerate the fluid droplets into larger fluid drops.

5. The optical element of claim 1, wherein the drive circuit is configured to variably adapt a frequency of the AC signals to vary a speed at which the droplets are swept across the outer surface.

6. The optical element of claim 1, wherein a last one of the plurality of electrode fingers is located proximate an edge of the outer surface to where the droplets are swept, wherein the last one of the plurality of electrode fingers is larger than other electrode fingers.

7. The optical element of claim 1 and further comprising a hydrophilic coating located proximate an edge of the outer surface to where the droplets are swept.

8. The optical element of claim 1, wherein the plurality of electrode fingers provide for capacitive sensing of droplets on the outer surface, and wherein the drive circuit is configured to apply the phase-modulated AC signals to the electrodes in response to the capacitive sensing of droplets on the outer surface.

9. The optical element of claim 1, wherein the plurality of electrode fingers are arranged in a plurality of tiles where each tile includes one finger of each of the number of electrodes provided in a sequential order, wherein the sequential order is repeated for each tile.

10. An optical element comprising:
a substrate having an outer surface on which droplets of fluid may form;
a plurality of independently activated electrodes each having a plurality of fingers positioned proximate the outer surface and extending across an area of the outer surface; and
a drive circuit for selectively applying signals to the plurality of electrodes,
wherein the electrode fingers are arranged with a uniform pitch, where the pitch is the distance between the centers of the electrodes, the pitch being less than or equal to 750 µm, wherein the drive circuit is further configured to selectively apply a voltage potential between adjacent fingers in such a manner as to conglomerate the fluid droplets into larger fluid drops.

11. The optical element of claim 10, wherein the pitch is less than or equal to 200 µm.

12. The optical element of claim 11, wherein the pitch is less than or equal to 100 µm.

13. The optical element of claim 10, wherein the drive circuit is configured to selectively apply phase-modulated AC signals to the plurality of electrodes.

14. The optical element of claim 13, wherein the phase-modulated AC signals applied to electrodes having adjacent fingers each are identical but have a time delay of time step $t_s$ in phase shifts relative to one another in such a manner as to continuously sweep fluid droplets in a predetermined direction across the outer surface.

15. The optical element of claim 10, wherein the electrode fingers are arranged in a single plane with gaps therebetween.

16. The optical element of claim 10, wherein the plurality of interdigitated fingers provide for capacitive sensing of droplets on the outer surface, and wherein the drive circuit is configured to applying the signals to the plurality of electrodes in response to the capacitive sensing of droplets on the outer surface.

17. The optical element of claim 10, wherein the plurality of interdigitated fingers are arranged in a plurality of tiles where each tile includes one finger of each of the plurality of electrodes provided in a sequential order, wherein the sequential order is repeated for each tile.

18. An optical element comprising:
a substrate having an outer surface on which droplets of fluid may form;
a plurality of independently activated electrodes each having a plurality of interdigitated fingers positioned proximate the outer surface and extending across an area of the outer surface; and
a drive circuit for selectively applying signals to the plurality of electrodes,
wherein the electrode fingers are arranged in a single plane with gaps therebetween, wherein the plurality of interdigitated fingers provide for capacitive sensing of droplets on the outer surface, and wherein the drive circuit is configured to apply the signals to the plurality of electrodes in response to the capacitive sensing of droplets on the outer surface.

19. The optical element of claim 18, wherein the drive circuit is configured to selectively apply phase-modulated AC signals to the plurality of electrodes.

20. The optical element of claim 19, wherein the phase-modulated AC signals applied to electrodes having adjacent fingers each are identical but have a time delay of time step $t_s$ in phase shifts relative to one another in such a manner as to continuously sweep fluid droplets in a predetermined direction across the outer surface.

21. The optical element of claim 18, wherein the electrode fingers are arranged with a uniform pitch, where the pitch is the distance between the centers of the electrodes, the pitch being less than or equal to 750 μm.

22. An optical element comprising:
a substrate having an outer surface on which droplets of fluid may form;
a plurality of independently activated electrodes each having a plurality of interdigitated fingers positioned proximate the outer surface and extending across an area of the outer surface; and
a drive circuit for selectively applying signals to the plurality of electrodes,
wherein the electrode fingers are arranged in a single plane with gaps therebetween, wherein the plurality of interdigitated fingers are arranged in a plurality of tiles where each tile includes one finger of each of the plurality of electrodes provided in a sequential order, wherein the sequential order is repeated for each tile.

* * * * *